United States Patent
Akkarakaran et al.

(10) Patent No.: US 11,051,324 B2
(45) Date of Patent: Jun. 29, 2021

(54) MULTI-BIT SCHEDULING REQUEST

(71) Applicant: QUALCOMM Incorporated, San Diego, CA (US)

(72) Inventors: Sony Akkarakaran, Poway, CA (US); Tao Luo, San Diego, CA (US); Peter Gaal, San Diego, CA (US); Yi Huang, San Diego, CA (US); Renqiu Wang, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 81 days.

(21) Appl. No.: 16/254,398

(22) Filed: Jan. 22, 2019

(65) Prior Publication Data
US 2019/0230690 A1 Jul. 25, 2019

Related U.S. Application Data

(60) Provisional application No. 62/621,040, filed on Jan. 23, 2018.

(51) Int. Cl.
*H04W 72/12* (2009.01)
*H04L 5/00* (2006.01)
*H04W 72/02* (2009.01)

(52) U.S. Cl.
CPC ......... *H04W 72/1268* (2013.01); *H04L 5/008* (2013.01); *H04L 5/0046* (2013.01);
(Continued)

(58) Field of Classification Search
CPC ......... H04W 72/1268; H04W 72/1284; H04W 72/1294; H04W 72/02; H04L 5/008; H04L 5/0051; H04L 5/0092; H04L 5/0046
(Continued)

(56) References Cited

U.S. PATENT DOCUMENTS

| 2012/0134305 A1* | 5/2012 | Damnjanovic | H04L 5/0053 370/280 |
| 2012/0269154 A1* | 10/2012 | Wang | H04W 72/1284 370/329 |

(Continued)

FOREIGN PATENT DOCUMENTS

WO 2017212314 A1 12/2017

OTHER PUBLICATIONS

Interdigital Inc: "SR Resource Configuration in NR", 3GPP Draft; R2-1708726 (R15 NR WI AI10315 SR Resource Configuration in NR), 3rd Generation Partnership Project (3GPP), Mobile Competence Centre; 650, Route Des Lucioles; F-06921 Sophia-Antipolis Cedex; France, vol. RAN WG2, No. Berlin, Germany; Aug. 21, 2017-Aug. 25, 2017 Aug. 20, 2017, XP051318531, Retrieved from the Internet: URL:http://www.3gpp.org/ftp/Meetings_3GPP_SYNC/RAN2/Docs/ [retrieved on Aug. 20, 2017], 2 pages.
(Continued)

*Primary Examiner* — Kwang B Yao
*Assistant Examiner* — Syed M Bokhari
(74) *Attorney, Agent, or Firm* — Loza & Loza, LLP

(57) ABSTRACT

Aspects of the present disclosure provide mechanisms for utilizing a single uplink grant to transmit scheduling requests (SRs) for two or more logical channels. A base station may allocate a separate grant of uplink resources for each SR opportunity (e.g., each logical channel for which a user equipment (UE) may transmit a SR to the base station). When the allocated uplink resources are within the same time period, the UE may select a subset of the SR opportunities for which to transmit a SR and partition the subset into one or more groups of SR opportunities. The UE may then generate one or more SR bits representing the one or more groups of SR opportunities and transmit the one or more SR bits on the single uplink grant.

27 Claims, 19 Drawing Sheets

(52) U.S. Cl.
CPC .......... *H04L 5/0051* (2013.01); *H04L 5/0092* (2013.01); *H04W 72/1284* (2013.01); *H04W 72/1294* (2013.01); *H04W 72/02* (2013.01)

(58) Field of Classification Search
USPC ................................................ 370/329, 280
See application file for complete search history.

(56) References Cited

U.S. PATENT DOCUMENTS

| | | | |
|---|---|---|---|
| 2018/0049227 A1* | 2/2018 | Moon | H04W 72/1268 |
| 2018/0063869 A1* | 3/2018 | Zhang | H04W 74/0833 |
| 2018/0206271 A1* | 7/2018 | Chatterjee | H04L 5/0053 |

OTHER PUBLICATIONS

International Search Report and Written Opinion—PCT/US2019/014798—ISA/EPO—dated Apr. 5, 2019.
NTT Docomo et al., "Scheduling Request Design in NR System", 3GPP Draft; R1-1713951, 3rd Generation Partnership Project (3GPP), Mobile Competence Centre; 650, Route Des Lucioles; F-06921 Sophia-Antipolis Cedex; France, vol. RAN WG1, No. Prague, Czechia; Aug. 21, 2017-Aug. 25, 2017 Aug. 20, 2017, XP051316743, Retrieved from the Internet: URL:http://www.3gpp.org/ftp/Meetings_3GPP_SYNC/RAN1/Docs/ [retrieved on Aug. 20, 2017], 3 pages.

* cited by examiner

DL-Centric Slot

UL-Centric Slot

US 11,051,324 B2

MULTI-BIT SCHEDULING REQUEST

PRIORITY CLAIM

This application claims priority to and the benefit of Provisional Patent Application No. 62/621,040 filed in the U.S. Patent and Trademark Office on Jan. 23, 2018, the entire contents of which are incorporated herein by reference as if fully set forth below in their entirety and for all applicable purposes.

TECHNICAL FIELD

The technology discussed below relates generally to wireless communication systems, and more particularly, to scheduling resources in wireless communications.

INTRODUCTION

Wireless transmissions between a base station and one or more user equipment (UE) within a cell are generally scheduled in each subframe or slot. For example, the base station may assign resources (e.g., time-frequency resources) for downlink transmissions to one or more UEs and grant the use of resources for uplink transmissions from one or more UEs. The downlink assignments and uplink grants may be provided to the UEs via a physical downlink control channel (PDCCH) or via higher layer signaling, such as radio resource control (RRC) signaling.

Uplink grants may be specified for uplink user data traffic. In addition, uplink control information (UCI) resource grants may be specified for particular UCI. Examples of UCI include scheduling requests for uplink user data traffic, channel quality indicator (CQI), multiple-input-multiple-output (MIMO) parameters, such as rank and precoder index, and hybrid automatic repeat request (HARQ) feedback transmissions, such as an acknowledgment (ACK) or negative acknowledgment (NACK) of a downlink transmission. UCI may be transmitted via a physical uplink control channel (PUCCH) or via a physical uplink shared channel (PUSCH). In addition, a base station may allocate UCI resources to a UE either dynamically using dynamic signaling (e.g., as downlink control information (DCI) within the PDCCH) or semi-statically using higher layer signaling (e.g., RRC signaling).

As the demand for mobile broadband access continues to increase, research and development continue to advance wireless communication technologies not only to meet the growing demand for mobile broadband access, but to advance and enhance the user experience with mobile communications.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure as a prelude to the more detailed description that is presented later.

Various aspects of the disclosure relate to mechanisms for utilizing a single uplink grant to transmit scheduling requests (SRs) for two or more logical channels. A base station may allocate a separate grant of uplink resources for each SR opportunity (e.g., each logical channel for which a user equipment (UE) may transmit a SR to the base station). When the allocated uplink resources are within the same time period (e.g., partially or completely overlapping in time, within the same slot or within a time duration threshold of one another), the UE may select a subset of the SR opportunities for which to transmit a SR and partition the subset into one or more groups of SR opportunities. The UE may then generate one or more SR bits representing the one or more groups of SR opportunities and transmit the one or more SR bits on the single uplink grant.

In some examples, a single SR bit may be generated for each group. In this example, if uplink data for at least one of the SR opportunities in a particular group is present in a buffer of the UE, the UE may set the SR bit for the group to indicate a positive SR. The base station may then either allocate uplink resources for each of the logical channels associated with the group of SR opportunities or may access other information, such as a buffer status report (BSR), to determine which logical channels associated with the group of SR opportunities should have uplink resources allocated. In other examples, when fewer SR bits are available than groups of SR opportunities, the UE may map a subset of group SR status combinations to bit combinations of the reduced number of SR bits. In this example, each group SR status for each group indicates either a positive SR, a negative SR, or an unknown SR for that group.

In some examples, when the SR opportunities further overlap with a resource allocation for other uplink control information (UCI) in a physical uplink control channel (PUCCH), the UE may append the one or more SR bits representing the one or more groups of SR opportunities to the UCI for transmission on the resources allocated to the UCI for the PUCCH. In other examples, the SR bit(s) generated for a group of SR opportunities may be transmitted on the resources allocated to one of the SR opportunities in the group.

In one example, a method of wireless communication is disclosed. The method includes determining that respective resources allocated to each of a plurality of scheduling request (SR) opportunities are within a same time period, in which the SR opportunities each correspond to a respective one of a plurality of logical channels. The method further includes identifying a subset of the plurality of SR opportunities for transmission, partitioning the subset into one or more groups of SR opportunities, and transmitting one or more SR bits representing the one or more groups of SR opportunities, in which the one or more SR bits represent at least two of the SR opportunities.

Another example provides an apparatus for wireless communication. The apparatus includes a transceiver, a memory, and a processor communicatively coupled to the transceiver and the memory. The processor is configured to determine that respective resources allocated to each of a plurality of scheduling request (SR) opportunities are within a same time period, in which the SR opportunities each correspond to a respective one of a plurality of logical channels. The processor is further configured to identify a subset of the plurality of SR opportunities for transmission, partition the subset into one or more groups of SR opportunities, and transmit one or more SR bits representing the one or more groups of SR opportunities, in which the one or more SR bits represent at least two of the SR opportunities.

Another example provides an apparatus for wireless communication. The apparatus includes means for determining that respective resources allocated to each of a plurality of scheduling request (SR) opportunities are within a same time period, in which the SR opportunities each correspond to a respective one of a plurality of logical channels. The apparatus further includes means for identifying a subset of the plurality of SR opportunities for transmission, means for partitioning the subset into one or more groups of SR opportunities, and means for transmitting one or more SR bits representing the one or more groups of SR opportunities, in which the one or more SR bits represent at least two of the SR opportunities.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
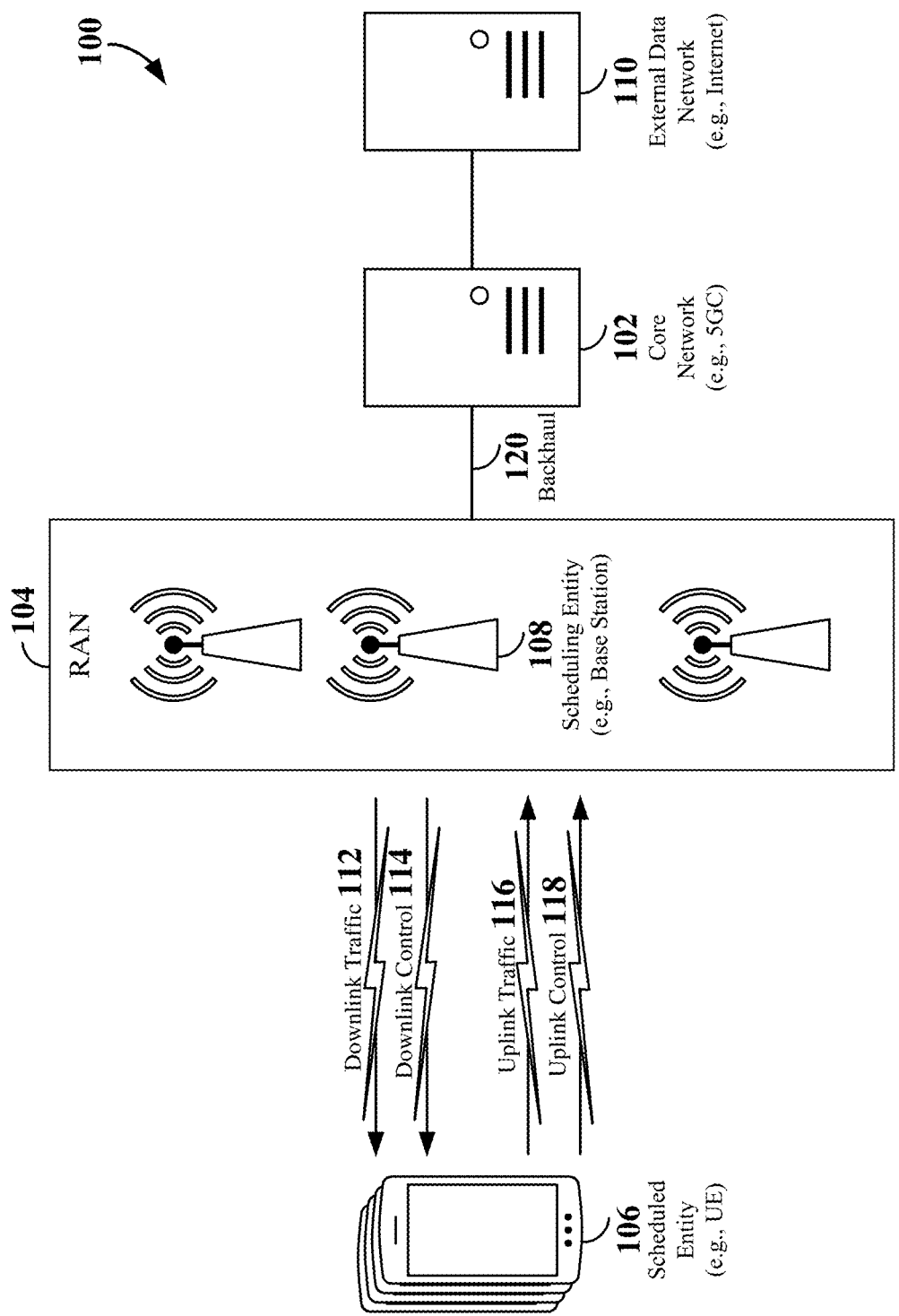
FIG. 1 is a schematic illustration of a wireless communication system.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
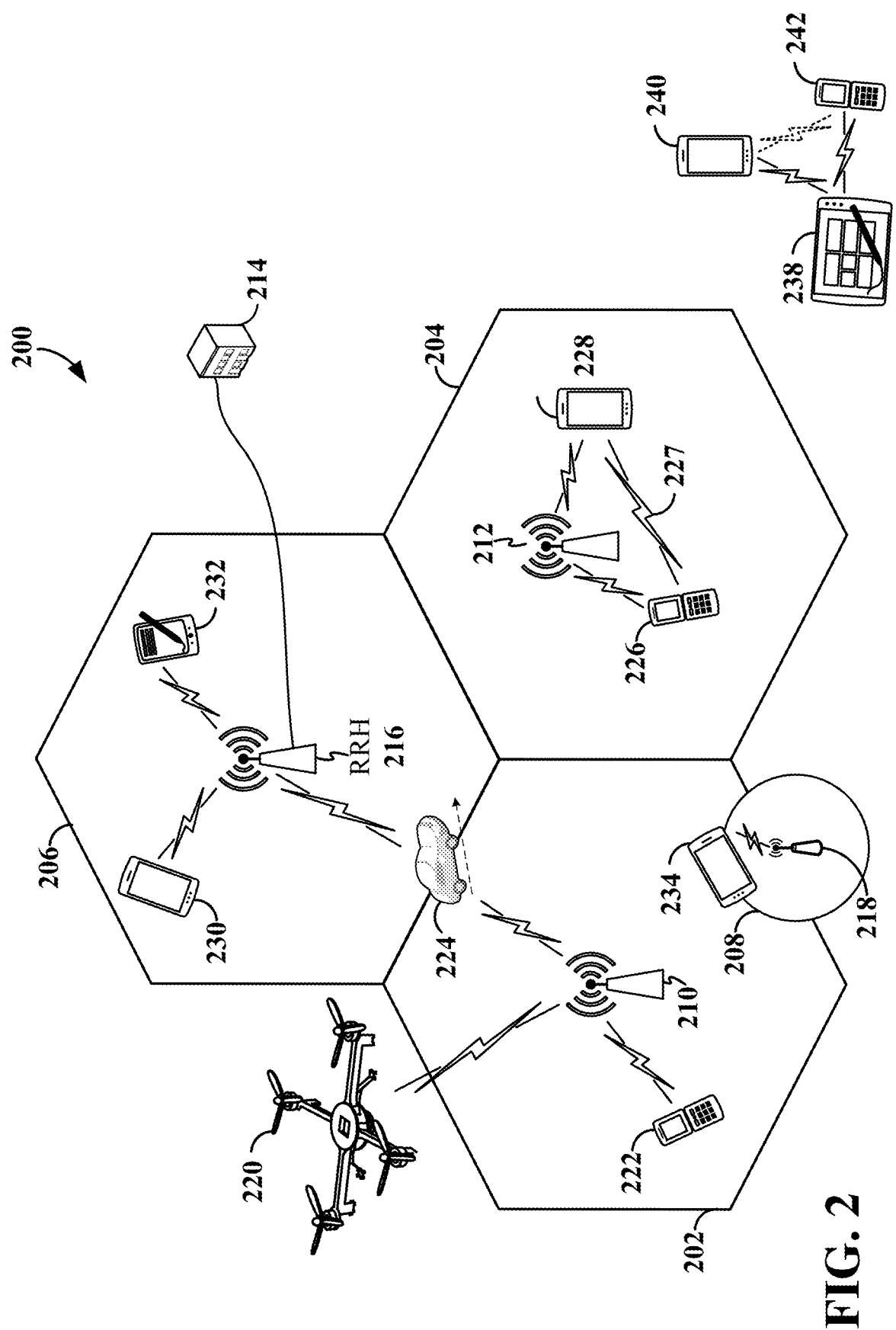
FIG. 2 is a conceptual illustration of an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In addition, the air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing OFDM with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 3. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Within the present disclosure, a frame refers to a duration of 10 ms for wireless transmissions, with each frame consisting of 10 subframes of 1 ms each. On a given carrier, there may be one set of frames in the UL, and another set of frames in the DL. Referring now to FIG. 3, an expanded view of an exemplary DL subframe 302 is illustrated, showing an OFDM resource grid 304. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Figure 3:
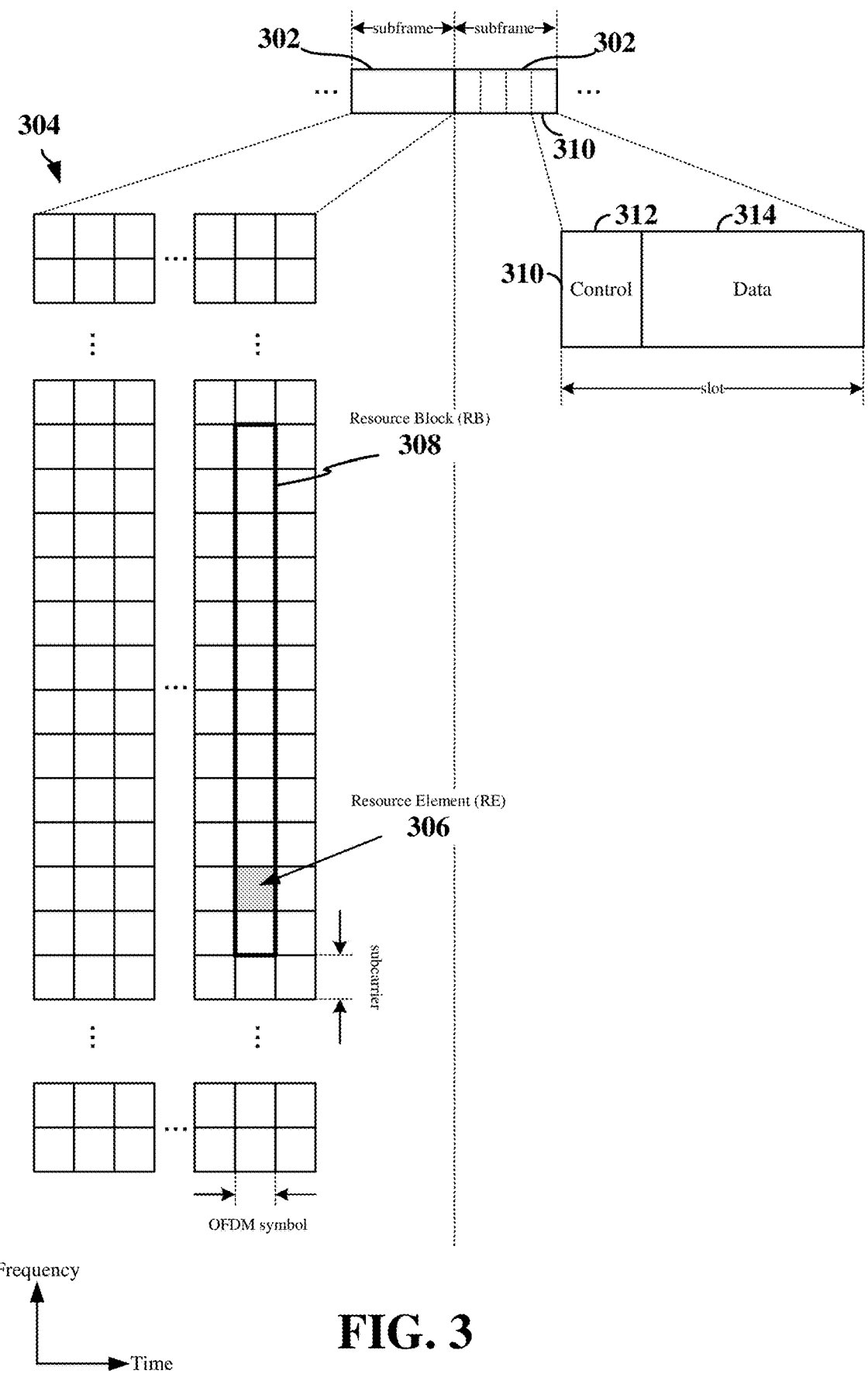
FIG. 3 is a schematic illustration of an organization of wireless resources in an air interface utilizing orthogonal frequency division multiplexing (OFDM).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity 108) may allocate one or more REs 306 (e.g., within a control region 312) to carry DL control information 114 including one or more DL control channels that generally carry information originating from higher layers, such as a physical broadcast channel (PBCH), a physical downlink control channel (PDCCH), etc., to one or more scheduled entities 106. The PDCCH may carry downlink control information (DCI) for one or more UEs in a cell. This can include, but is not limited to, power control commands, scheduling information, a grant, and/or an assignment of REs for DL and UL transmissions.

In addition, DL REs may be allocated to carry DL physical signals that generally do not carry information originating from higher layers. These DL physical signals may include a primary synchronization signal (PSS); a secondary synchronization signal (SSS); demodulation reference signals (DM-RS); phase-tracking reference signals (PT-RS); channel-state information reference signals (CSI-RS); etc. The synchronization signals PSS and SSS (collectively referred to as synchronization signals (SS)), and in some examples, the PBCH, may be transmitted in an SS block that includes 4 consecutive OFDM symbols, numbered via a time index in increasing order from 0 to 3. In the frequency domain, the SS block may extend over 240 contiguous subcarriers, with the subcarriers being numbered via a frequency index in increasing order from 0 to 239. Of course, the present disclosure is not limited to this specific SS block configuration. Other nonlimiting examples may utilize greater or fewer than two synchronization signals; may include one or more supplemental channels in addition to the PBCH; may omit a PBCH; and/or may utilize non-consecutive symbols for an SS block, within the scope of the present disclosure.

In an UL transmission, a transmitting device (e.g., a scheduled entity 106) may utilize one or more REs 406 to carry UL control information 118 (UCI). The UCI can originate from higher layers via one or more UL control channels, such as a physical uplink control channel (PUCCH), a physical random access channel (PRACH), etc., to the scheduling entity 108. Further, UL REs may carry UL physical signals that generally do not carry information originating from higher layers, such as demodulation reference signals (DM-RS), phase-tracking reference signals (PT-RS), SRSs, etc. In some examples, the control information 118 may include a scheduling request (SR), i.e., a request for the scheduling entity 108 to schedule uplink transmissions. Here, in response to the SR transmitted on the control channel, the scheduling entity 108 may transmit downlink control information 114 that may schedule resources for uplink packet transmissions.

UL control information may also include hybrid automatic repeat request (HARQ) feedback such as an acknowledgment (ACK) or negative acknowledgment (NACK), channel state information (CSI), or any other suitable UL control information. HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In addition to control information, one or more REs 406 (e.g., within the data region 414) may be allocated for user data or traffic data. Such traffic may be carried on one or more traffic channels, such as, for a DL transmission, a physical downlink shared channel (PDSCH); or for an UL transmission, a physical uplink shared channel (PUSCH).

The channels or carriers described above and illustrated in FIGS. 1 and 3 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Figure 4:
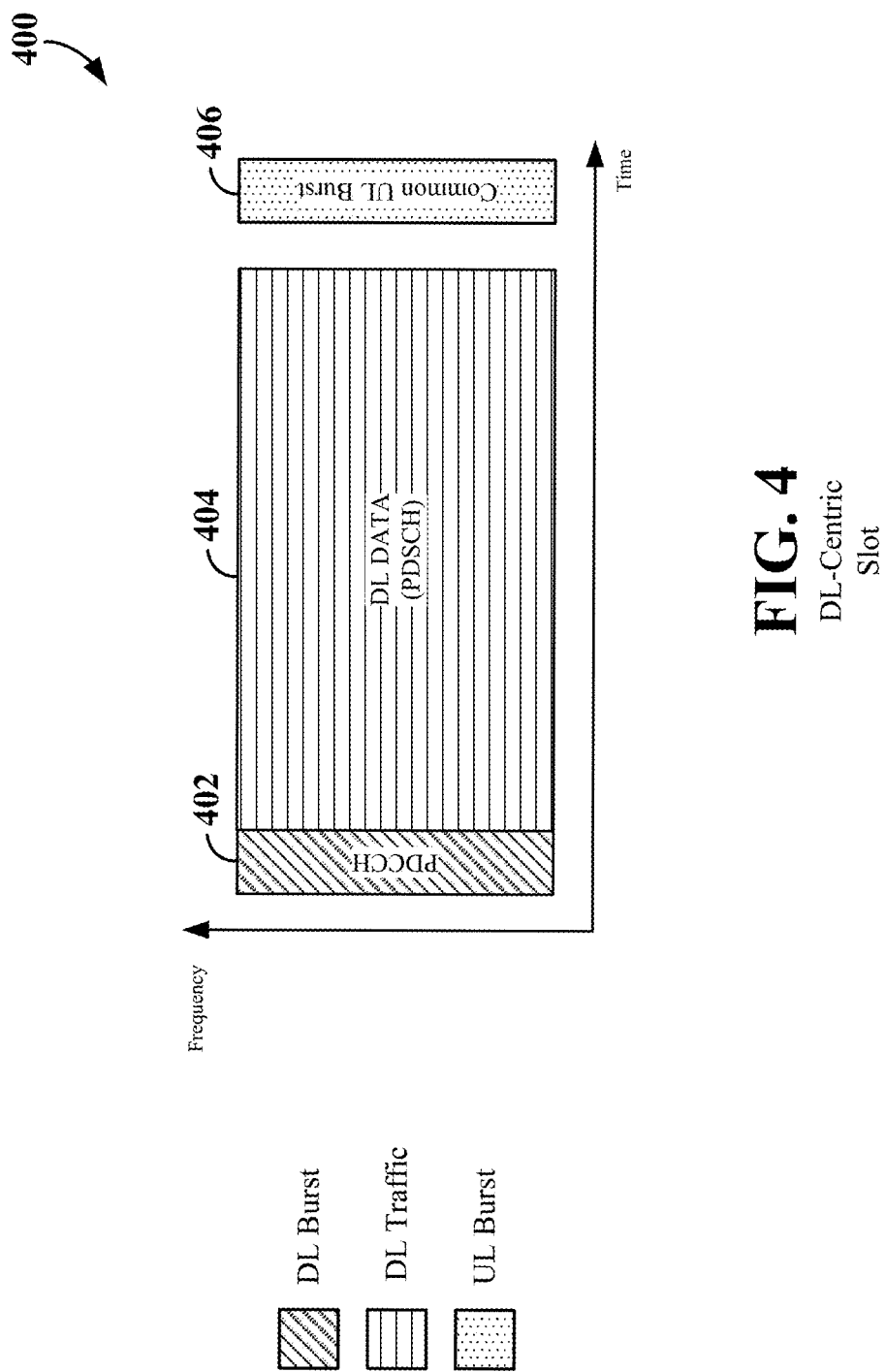
FIG. 4 is a diagram illustrating an example of a downlink (DL)-centric slot.
Figure 5:
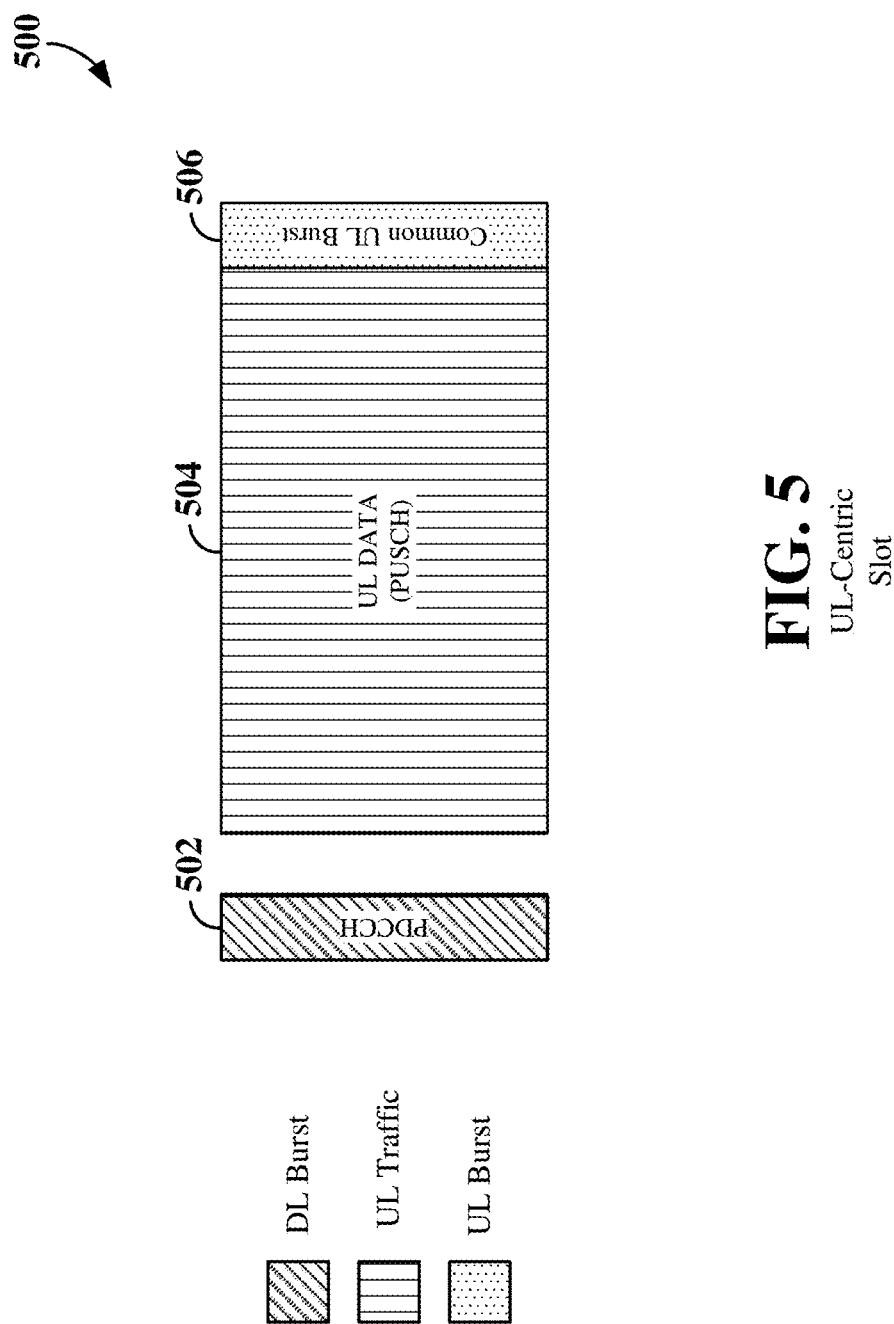
FIG. 5 is a diagram illustrating an example of an uplink (UL)-centric slot.

FIGS. 4 and 5 illustrate two example structures of slots 400 and 500, respectively. The slots 400 and/or 500 may be used, in some examples, in place of the slot 310 described above and illustrated in FIG. 3.

FIG. 4 is a diagram illustrating an example of a downlink (DL)-centric slot 400 according to some aspects of the disclosure. The nomenclature DL-centric generally refers to a structure wherein more resources are allocated for transmissions in the DL direction (e.g., transmissions from the scheduling entity 108 to the scheduled entity 106). In the example shown in FIG. 4, time is illustrated along a horizontal axis, while frequency is illustrated along a vertical axis. The time-frequency resources of the DL-centric slot 400 may be divided into a DL burst 402, a DL traffic region 404 and an UL burst 406.

The DL burst 402 may exist in the initial or beginning portion of the DL-centric slot. The DL burst 402 may include any suitable DL information in one or more channels. In some examples, the DL burst 402 may include various scheduling information and/or control information corresponding to various portions of the DL-centric slot. In some configurations, the DL burst 402 may be a physical DL control channel (PDCCH), as indicated in FIG. 4. The DL-centric slot may also include a DL traffic region 404. The DL traffic region 404 may sometimes be referred to as the payload of the DL-centric slot. The DL traffic region 404 may include the communication resources utilized to communicate DL user data traffic from the scheduling entity 108 (e.g., gNB) to the scheduled entity 106 (e.g., UE). In some configurations, the DL traffic region 404 may include a physical DL shared channel (PDSCH).

The UL burst 406 may include any suitable UL information in one or more channels. In some examples, the UL burst 406 may include feedback information corresponding to various other portions of the DL-centric slot. For example, the UL burst 406 may include feedback information corresponding to the DL burst 402 and/or DL traffic region 404. Non-limiting examples of feedback information may include an ACK signal, a NACK signal, a HARQ indicator, and/or various other suitable types of information. The UL burst 406 may include additional or alternative information, such as information pertaining to random access channel (RACH) procedures, scheduling requests (SRs) (e.g., within a PUCCH), and various other suitable types of information.

As illustrated in FIG. 4, the end of the DL traffic region 404 may be separated in time from the beginning of the UL burst 406. This time separation may sometimes be referred to as a gap, a guard period, a guard interval, and/or various other suitable terms. This separation provides time for the switch-over from DL communication (e.g., reception operation by the scheduled entity 106 (e.g., UE)) to UL communication (e.g., transmission by the scheduled entity 106 (e.g., UE)). One of ordinary skill in the art will understand that the foregoing is merely one example of a DL-centric slot and alternative structures having similar features may exist without necessarily deviating from the aspects described herein.

FIG. 5 is a diagram showing an example of an uplink (UL)-centric slot 500 according to some aspects of the disclosure. The nomenclature UL-centric generally refers to a structure wherein more resources are allocated for transmissions in the UL direction (e.g., transmissions from the scheduled entity 106 to the scheduling entity 108). In the example shown in FIG. 5, time is illustrated along a horizontal axis, while frequency is illustrated along a vertical axis. The time-frequency resources of the UL-centric slot 500 may be divided into a DL burst 502, an UL traffic region 504 and an UL burst 506.

The DL burst 502 may exist in the initial or beginning portion of the UL-centric slot. The DL burst 502 in FIG. 5 may be similar to the DL burst 402 described above with reference to FIG. 4. The UL-centric slot may also include an UL traffic region 504. The UL traffic region 504 may sometimes be referred to as the payload of the UL-centric slot. The UL traffic region 504 may include the communication resources utilized to communicate UL user data traffic from the scheduled entity 106 (e.g., UE) to the scheduling entity 108 (e.g., gNB). In some configurations, the UL traffic region 504 may be a physical UL shared channel (PUSCH). As illustrated in FIG. 5, the end of the DL burst 502 may be separated in time from the beginning of the UL traffic region 504. This time, separation may sometimes be referred to as a gap, guard period, guard interval, and/or various other suitable terms. This separation provides time for the switchover from DL communication (e.g., reception operation by the scheduled entity 106 (e.g., UE)) to UL communication (e.g., transmission by the scheduled entity 106 (e.g., UE)).

The UL burst 506 in FIG. 5 may be similar to the UL burst 406 described above with reference to FIG. 4. The UL burst 506 may additionally or alternatively include information pertaining to channel quality indicator (CQI), SRSs, and various other suitable types of information. One of ordinary skill in the art will understand that the foregoing is merely one example of an UL-centric slot, and alternative structures having similar features may exist without necessarily deviating from the aspects described herein.

In legacy (e.g., 4G) wireless communication networks, such as the LTE wireless network, a UE may transmit UCI on only one of either the PUCCH or the PUSCH within a single subframe in order to maintain a low peak-to-average power ratio (PAPR). However, in 5G NR wireless communication networks, UCI may be transmitted within both the PUSCH (e.g., traffic region 504) and PUCCH (e.g., UL burst 506) of an UL-centric slot 500.

In addition, in legacy (e.g., 4G) wireless communication networks, such as the LTE wireless network, PUCCH resources are typically allocated semi-statically using higher layer signaling (e.g., radio resource control (RRC) signaling), while PUSCH resources are typically allocated dynamically using dynamic signaling (e.g., as downlink control information (DCI) within the PDCCH). However, in 5G NR wireless communication networks, PUCCH resources may be allocated both semi-statically and dynamically. Semi-statically granted PUCCH resources may carry, for example, periodic UCI, such as periodic scheduling requests, CQI, and HARQ feedback transmissions for periodic or semi-persistent downlink transmissions. Dynamically granted PUCCH or PUSCH resources may carry, for example, aperiodic UCI, such as HARQ feedback transmissions for regular downlink transmissions (e.g., not periodic or semi-persistent downlink transmissions), HARQ feedback transmissions for certain PDCCH information, and aperiodic CQI reports.

Figure 6:
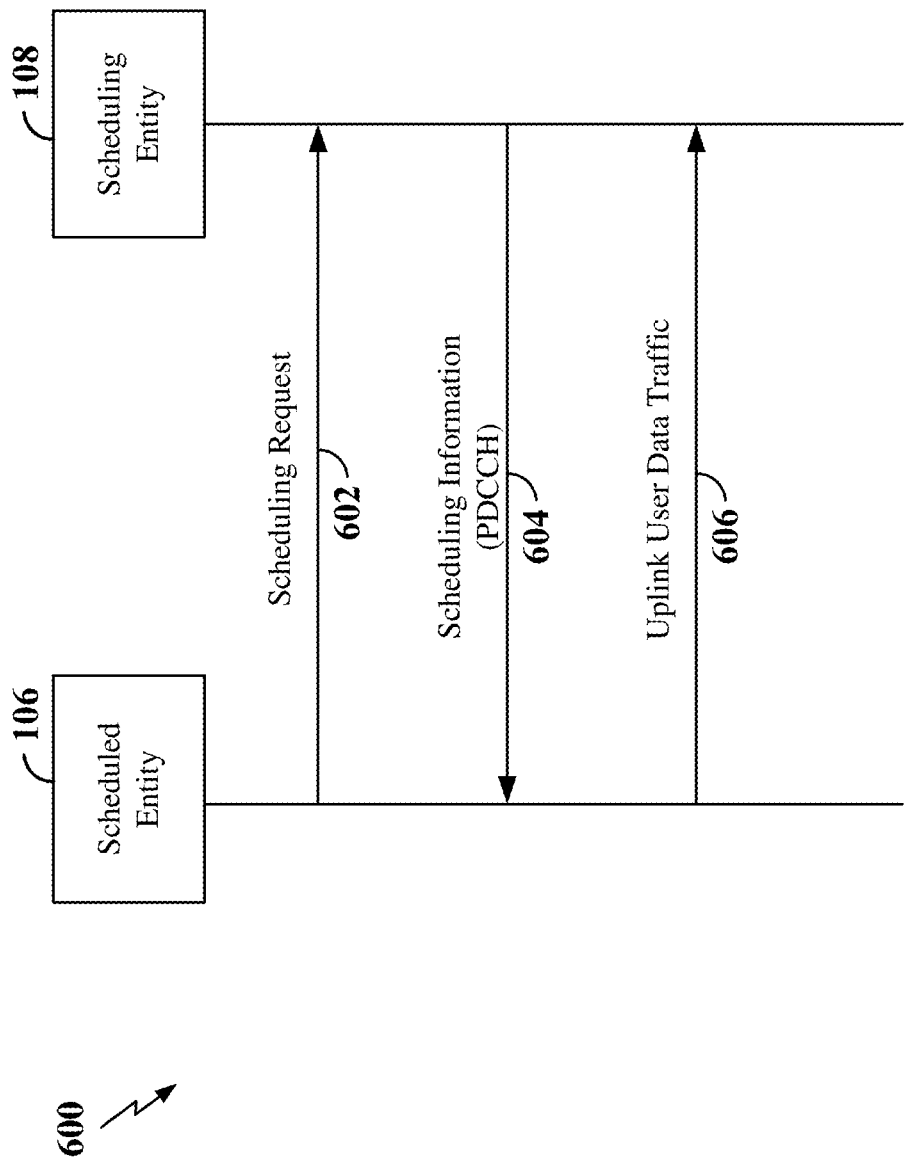
FIG. 6 is a signaling diagram illustrating exemplary signaling for dynamic scheduling.

FIG. 6 is a signaling diagram 600 illustrating exemplary signaling for dynamic scheduling of PUSCH resources. When user data traffic arrives in a buffer of a scheduled entity 106, at 602, the scheduled entity 106 may transmit a scheduling request to the scheduling entity 108 to request an uplink grant of time-frequency resources (e.g., resource elements/resource blocks) for the scheduled entity 106 to transmit the user data traffic to the scheduling entity 108. The scheduling request may be transmitted, for example, via the PUCCH within an UL burst of a DL-centric slot or an UL-centric slot utilizing previously granted resources within the PUCCH for the scheduling request.

In response to the scheduling request, the scheduling entity 108 may allocate a set of one or more resource elements (e.g. which may correspond to one or more resource blocks) to the scheduled entity 106, and at 604, transmit scheduling information corresponding to the uplink grant (e.g., information indicative of the assigned resource elements) to the scheduled entity 106. In some cases, the scheduling entity may consider the UE's transmission of a buffer status report (BSR), which provides information about the UE's UL data volume, to allocate the resource elements for the uplink grant. The scheduling information may be transmitted, for example, via the PDCCH within a DL burst of a DL-centric slot or an UL-centric slot. In some examples, the scheduling information may be masked (scrambled) with the cell radio network temporary identifier (C-RNTI) of the scheduled entity. At 606, the scheduled entity 106 may then utilize the assigned uplink resource element(s) to transmit the user data traffic to the scheduling entity 108. The assigned uplink resources for the traffic may be within the same slot as the PDCCH (e.g., when the PDCCH is transmitted in an UL-centric slot) or within a subsequent slot (e.g., when the PDCCH is transmitted in a DL-centric slot).

The scheduling entity 108 (e.g., base station or gNB) may configure scheduling request (SR) transmissions for each scheduled entity 106 (e.g., UE) using higher layer signaling (e.g., RRC configuration). This configuration may include indicating of a set of resources on which a UE can send the SR. These SR transmission opportunities may use a given periodicity, symbol offset, etc.

According to current specifications for 5G NR, a UE may be provided different SR configurations (i.e., different sets of resources for SR transmissions) for each of multiple different traffic types. Here, different traffic types may be user data traffic associated with different logical channels, such as enhanced Mobile Broadband (eMBB) traffic, ultra-reliability and low-latency communication (URLLC) traffic, etc. In some examples, URLLC traffic may require more frequent SR transmission opportunities (e.g., a shorter periodicity) than may be required for eMBB traffic.

Figure 7:
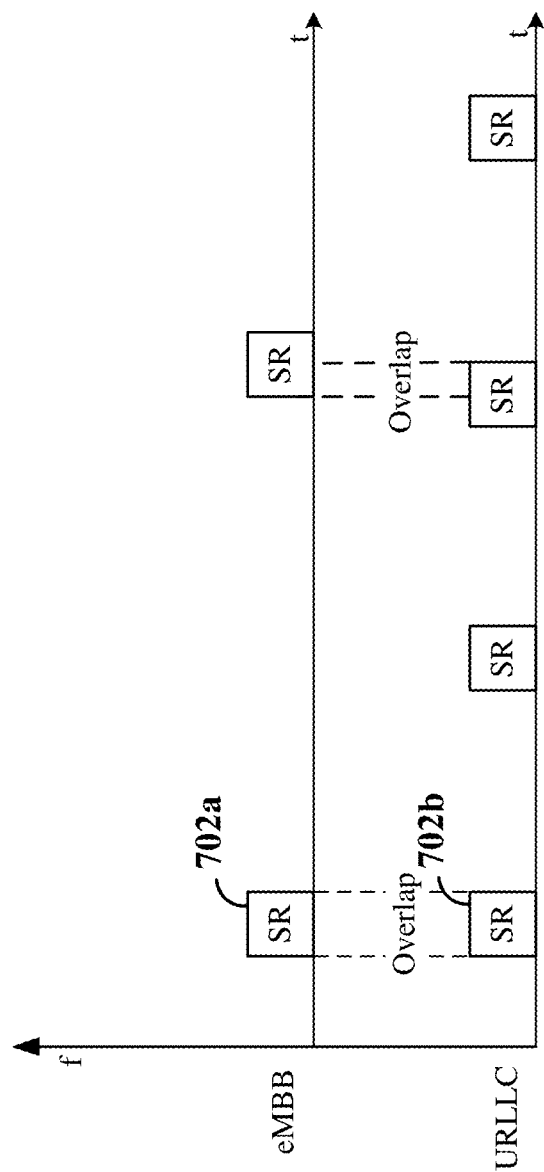
FIG. 7 is a schematic illustration of a resource allocation for scheduling request (SR) opportunities for two different traffic types at a given device.

FIG. 7 illustrates a resource allocation for scheduling request (SR) opportunities for two different traffic types (e.g., two different logical channels) at a given device (e.g., a UE). As shown in FIG. 7, it may occur that a UE is allocated two or more SR resources 702a and 702b, corresponding to the different SR configurations, which coincide or overlap in time. This overlap may occur at the same set of OFDM symbols or may partially overlap within the same slot. In order to transmit overlapping SRs, the multiple SRs may be frequency division multiplexed using different physical resource blocks (PRBs) during the same OFDM symbol. However, frequency division multiplexing of the different SRs may result in a high PAPR, intermodulation distortion (IMD), maximum power reduction (MPR) issues, etc. Therefore, Release 15 of the 5G NR specifications only allow a UE to transmit a single SR in any given OFDM symbol.

In this scenario, if a UE has data for transmission for both traffic types, and the respective SR transmission opportunities for each traffic type overlap in time, the UE may transmit only one of the SRs. In some examples, the UE may select the SR that corresponds to the highest priority logical channel for which a positive SR (e.g., a request for resources for an uplink grant) is to be sent.

Figure 8:
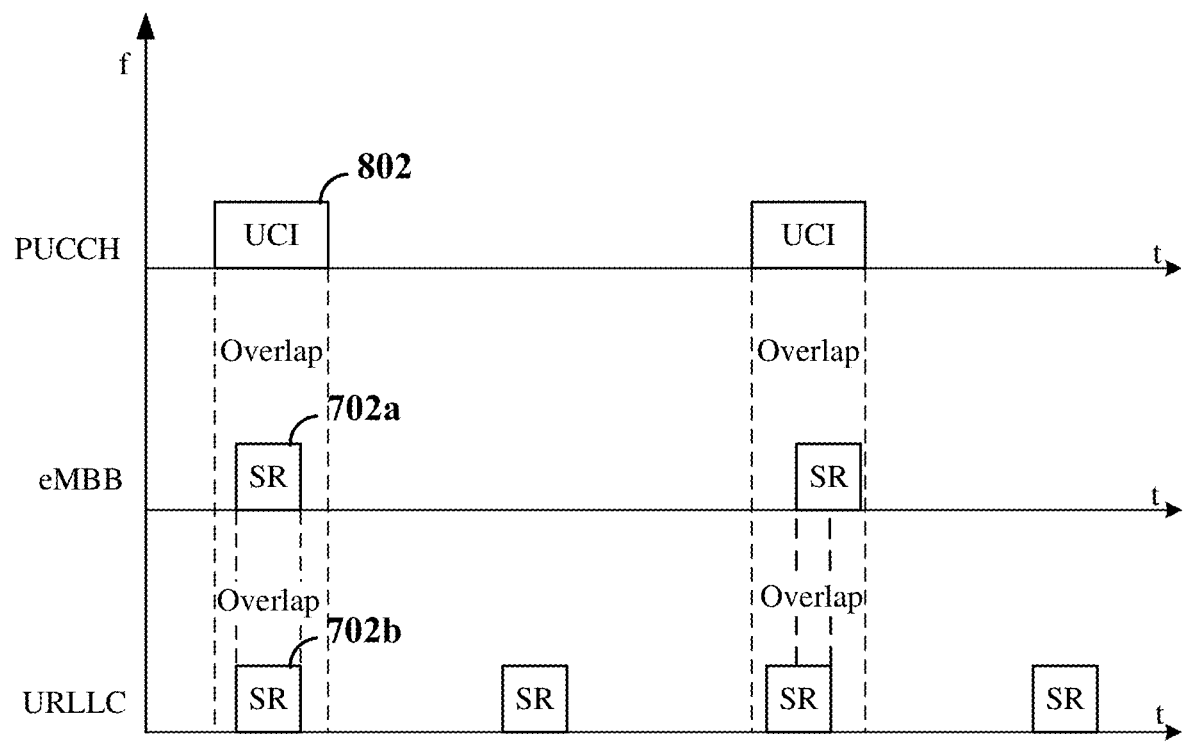
FIG. 8 is a schematic illustration of a resource allocation for scheduling request (SR) opportunities for two different traffic types and other uplink control information (UCI) at a given device.

Furthermore, as illustrated in FIG. 8, SR resources 702a and 702b may happen to partially or completely overlap with other uplink control information (UCI) resources 802 scheduled for the PUCCH. Such other UCI may include a HARQ-ACK, channel state information, etc. Similar to the above concerns with overlapping SR resources, here, it may be desired to avoid FDM transmissions of the SR and other UCI on the PUCCH.

In this scenario, Release 15 of the 5G NR specifications allows the UE to include the SR bit for one of the SRs along with the other UCI bits in the UCI resources 802, rather than using the resource scheduled for that SR. For example, the SR bit for the URLLC traffic may be appended to HARQ-ACK bits (or other UCI bits) prior to encoding, and the encoded HARQ-ACK+SR information may be transmitted on the scheduled UCI resources 802 for the PUCCH. In this manner, an FDM transmission of the SR for the URLLC traffic and the other PUCCH information can be avoided. However, the inclusion of multiple SR bits within a PUCCH transmission is not currently supported in Release 15 of the 5G NR specifications. Therefore, if the resources allocated to two or more SR opportunities overlap (partially or completely) with the resources allocated to other UCI, a UE may select only one of the SR opportunities for inclusion with the other UCI.

In accordance with various aspects of the present disclosure, to manage separate UL resource grants for different scheduling request (SR) opportunities, a UE may be configured to partition SR opportunities occurring within a same time period into one or more groups and generate and transmit one or more SR bits representing the one or more groups of SR opportunities. In some examples, a single SR bit may be generated for each group.

Figure 9:
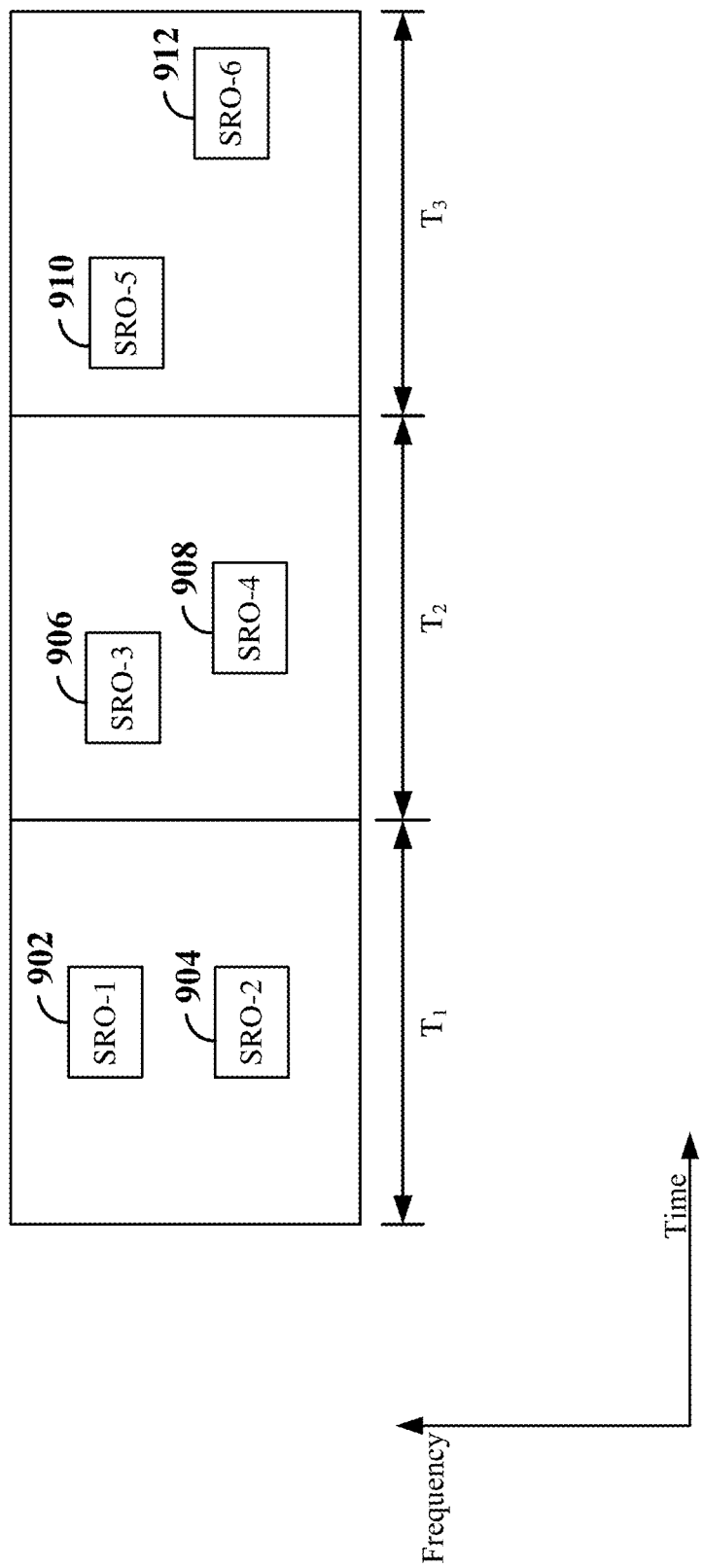
FIG. 9 is a diagram illustrating examples of multiple SR opportunities occurring within a same time period.

For example, referring now to FIG. 9, three time periods $T_1$, $T_2$, and $T_3$ are illustrated. In some examples, each time period $T_1$, $T_2$, and $T_3$ may include, for example, a set of one or more OFDM symbols, a mini-slot, a slot, or a set of slots. In each of the time periods $T_1$, $T_2$, and $T_3$, separate resources have been allocated for different SR opportunities (SROs). That is, for a UE having flows of multiple different traffic types, scheduled opportunities for the UE to transmit an SR for the respective traffic types may occur in the same time period, and in some cases, fully or partially overlap with one another in time.

In $T_1$, there are two SRO resources 902 and 904, each including a respective set of resource elements for different SROs (SRO-1 and SRO-2). In $T_1$, the SRO resources 902 and 904 are fully overlapping in time. Similarly, in $T_2$, there are two SRO resources 906 and 908, each including a respective set of resource elements for different SROs (SRO-3 and SRO-4). In $T_2$, the SRO resources 906 and 908 partially overlap one another in time. Likewise, in $T_3$, there are two SRO resources 910 and 912, each including a respective set of resource elements for different SROs (SRO-5 and SRO-6). In $T_3$, the SRO resources 910 and 912 occur within the same time period ($T_3$), though they are not overlapping in time.

In the scenario represented in $T_3$, a UE may be configured with a threshold time duration corresponding to the time period (e.g., $T_3$) or a portion thereof and determine whether a time difference between SRO resources 910 and 912 is within less than the threshold time duration. Here, the threshold time duration may be measured in units of time, OFDM symbols, or any other suitable units. The time difference may be determined from the start or end of each of the SRO resources 910 and 912. If the time difference is less than the threshold time duration, the UE may determine that the SRO resources 910 and 912 occur within the same time period $T_3$. This scenario may be expanded to include any number of SROs. For example, the UE may determine that each of a plurality of SROs occur within the same time period (e.g., $T_3$) when the time difference between each pair of SRO resources is within the threshold time duration. In this case, the UE may determine that each of the plurality of SROs are within less than the threshold time duration apart from one another, and as such, consider the SROs to occur within the same time period.

In some examples, in each of $T_1$, $T_2$ and $T_3$, the UE may partition the SROs occurring in the same time period into one or more groups and generate and transmit a single SR bit for each group of SR opportunities. That is, the UE may transmit a positive SR for a given group if UL data (user data traffic) arrives at that UE for any logical channel corresponding to that group. Otherwise, if there is no data for all logical channels corresponding to a given group, then the UE may transmit a negative SR corresponding to that group. In some existing systems, an SR may be omitted when a UE does not need UL resources, or when the UE does not have UL data to transmit. However, this can result in some ambiguity between the scheduled and scheduling entities, as to how many bits to expect in the UL transmission. Accordingly, by including one bit, with its value determined by whether the SR to be sent is positive or negative, any such ambiguity can be relieved, and the scheduling entity can be certain how many bits to expect, at least with respect to the SR transmissions.

The SR bit for a particular group may be transmitted within the resources allocated to one of the SR opportunities in the group or may be transmitted on resources allocated to other uplink control information (UCI) for the physical uplink control channel (PUCCH) (e.g., the SR bit may be appended to the UCI prior to encoding and transmitting the UCI+SR on the resources allocated to the UCI).

Here, when the scheduling entity receives an SR corresponding to a group that represents plurality of logical channels or traffic types, the scheduling entity may not necessarily know which logical channel actually have data to transmit. In some examples, the scheduling entity may schedule resources for all logical channels in that group. In other examples, the scheduling entity may take into account other information, such as buffer status report (BSR) transmissions corresponding to the respective logical channels or traffic types, to determine which one or ones among that group should have UL resources scheduled.

As one particular example, each 'group' may represent an individual SR resource. That is, it may be the case that each group includes only one SR opportunity. In other examples, where grouping two or more SR opportunities into one or more of the groups is needed, the UE may determine the grouping or partitioning of SR opportunities based on one or more suitable parameters or factors. For example, the UE may group together SR opportunities that have a comparable number of resource elements (REs) included in their respective SRO resources. For example, each group of SR opportunities may be associated with a different respective range of numbers of REs. In a further example, the UE may group together SR opportunities based on the respective priorities of each of the logical channels (e.g., each group of SROs may be associated with a single logical channel priority or with a set of two or more logical channel priorities). In still a further example, the UE may group together SROs based on the time resources allocated to each of the SROs. For example, the UE may group together a first set of SROs that occur earlier in the time period and a second set of SROs that occur later in the time period (e.g., each group may be associated with a respective time range within the time period). In yet another example, the number of groups may be based on a target number of SR bits. For example, the target number of SR bits may be based on the capacity of the resources allocated to one of the SROs in the group or to a PUCCH overlapping (or within the same time period as) the SROs that may carry other UCI bits in addition to the SR bits.

Referring again to the example shown in FIG. 9, in $T_1$, the UE may partition SRO-1 and SRO-2 into a first group of SROs and generate a single SR bit representing both SRO-1 and SRO-2. This single SR bit may be transmitted on either SRO resource 902 or SRO resource 904. Similarly, in $T_2$, the UE may partition SRO-3 and SRO-4 into a second group of SROs and generate a single SR bit representing both SRO-3 and SRO-4. This single SR bit may be transmitted on either SRO resource 906 or SRO resource 908. Likewise, in $T_3$, the UE may partition SRO-5 and SRO-6 into a third group of SROs and generate a single SR bit representing both SRO-5 and SRO-6. This single SR bit may be transmitted on either SRO resource 910 or SRO resource 912.

In some examples, the number of SROs within a particular period of time may be reduced prior to partitioning the remaining SROs into groups. For example, the UE may determine that there are too many SROs within a particular time period and may accordingly behave as if some of those SROs were cancelled or did not exist. In other words, the UE may identify a subset of the SROs (e.g., where the subset includes one or more SROs) allowed for transmission. For any such disallowed or cancelled SRO, if data arrives in the buffer for the corresponding logical channel, the UE may send a positive SR at the next opportunity in that SR configuration, assuming it is still needed. That is, before the next SRO, the UE may receive an UL grant that can be used for transmission of that data from the buffer for that corresponding logical channel. In some examples, the UE may identify the subset to include all of the SROs scheduled within a particular time period when the UE determines that all SROs may be appropriately grouped.

Figure 10:
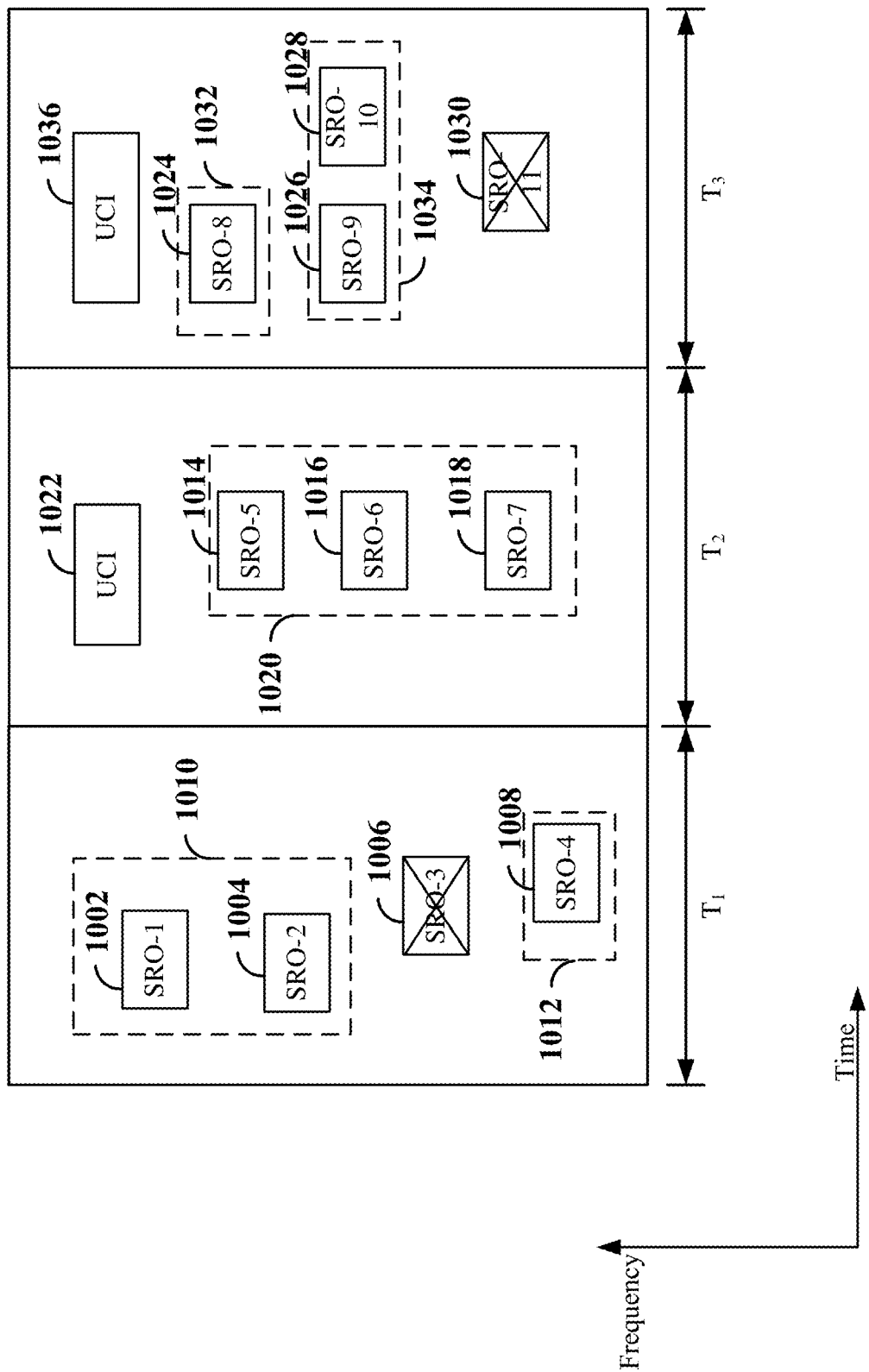
FIG. 10 is a diagram illustrating examples of groups of SR opportunities occurring within a same time period.

For example, referring now to FIG. 10, three time periods $T_1$, $T_2$, and $T_3$ are again illustrated. As in FIG. 9, each time period $T_1$, $T_2$, and $T_3$ may include, for example, a set of OFDM symbols, a mini-slot, a slot, or a set of slots. In each of the time periods $T_1$, $T_2$, and $T_3$, separate resources have been allocated for different SR opportunities (SROs).

In $T_1$, there are four SRO resources 1002, 1004, 1006, and 1008, each including a respective set of resource elements for different SROs (SRO-1, SRO-2, SRO-3, and SRO-4). Several of the SROs overlap at least partially with one another in time, and each of the SROs occur within a threshold time duration of one another. The UE may determine that in time period $T_1$ there are too many SROs scheduled to be able to effectively group the SROs. Therefore, the UE may identify a subset of the SROs that may be partitioned into groups. In the example shown in FIG. 10, in $T_1$, the subset includes SRO-1, SRO-2, and SRO-4. As SRO-3 was not selected for inclusion in the subset, the UE may effectively cancel or ignore SRO-3.

Here, the UE may determine the subset of SROs allowed for transmission based on a suitable set of factors or parameters. For example, the UE may determine to allow an SRO for an SR that corresponds to a higher-priority logical channel, while dropping an SRO for an SR that corresponds to a lower-priority logical channel. In an example, the UE may select the SROs associated with logical channels having a respective priority greater than a minimum priority for inclusion in the subset of SROs. This priority-based selection may be expanded to any number of overlapping SROs, and any number of priority levels for the corresponding logical channels.

In another example, the UE may determine to include an SRO in the subset of SROs based on the resource(s) allocated for that SRO. For example, the UE may determine to include an SRO in the subset that occurs earlier in time over another SRO that occurs later in time. In another example, the UE may determine to allow an SRO that includes a greater number of resource elements (REs), while dropping an SRO that includes fewer REs. In an example, the UE may select the SROs including at least a threshold number of REs within the respective resources allocated thereto for inclusion in the subset of SROs.

In a further example, the UE may determine which SROs to allow based on any suitable combination of the above exemplary parameters or factors. The specific algorithm used by a particular UE may be fixed, e.g., by virtue of being required in a telecommunication standard. In another example, the algorithm used by a particular UE may be configurable, e.g., by utilizing suitable control signaling from a scheduling entity, being set on a per-cell basis, a per-UE basis, etc.

The UE may then partition the identified subset of SROs (e.g., SRO-1, SRO-2, and SRO-4) into one or more groups of SROs. Here, the UE may partition SRO-1 and SRO-2 into a first group 1010 of SROs, and SRO-4 into a second group 1012 of SROs. The UE may then generate a single SR bit representing both SRO-1 and SRO-2 and a single bit representing SRO-4. The UE may then transmit the SR bits for the first and second groups 1010 and 1012 on one of the SRO resources in the groups (e.g., SRO resource 1002, SRO resource 1004, or SRO resource 1008). Here, the selected SRO resource may implicitly use a different PUCCH transmission format, so as to be able to carry the increased number of bits. For example, the selected SRO resource may utilize PUCCH format 2, 3, or 4, instead of PUCCH format 0 or 1, as those formats are defined in 3GPP specifications for 5G NR. In this example, the necessary parameters for the new format can be pre-configured as part of SRO resource configuration (e.g., via RRC signaling).

In $T_1$, since there are multiple SR bits (one for each of the SRO groups) that are transmitted on one of the SRO resources 1002, 1004, or 1006, the UE may generate an SR bit field including the multiple SR bits and map between a given SRO group and a particular SR bit (bit location) in the SR bit field. In one example, the UE may map the respective SRO groups to SR bits for transmission based on a decreasing order of logical channel priority. For example, a UE may assign a priority for a given group of SROs as the maximum priority of the associated logical channels for that group. Of course, the maximum need not be used, and a UE may utilize any parameter based on the priorities of the associated logical channels for that group, such as the maximum, minimum, median, etc.

In another example, the UE may map the respective SRO groups to SR bits for transmission based on the resources allocated to the respective groups. For example, the group having the earliest or largest resource assignment, either for an individual SRO within the group, or some combination of the SROs in that group, may be mapped to the first SR bit for transmission.

In other examples, a combination of the above factors or parameters may be used to map the respective SRO groups to SR bits for transmission. For example, the logical channel priority may be used by default, and the resource assignment(s) of the respective groups may be used as a tie breaker in case two SRO groups have the same priority. Of course, any other suitable combination of the above factors may be used in a given implementation.

As described above, the SROs that occur within a given time period may further fully or partially overlap with (or be included within the same time period as) another UL resource allocation, such as an allocation for a HARQ-ACK transmission, a CSI transmission, or other uplink control information (UCI). In some examples, the UE may utilize the threshold time duration corresponding to the time period or a portion thereof to determine whether a time difference between each of the SRO resources and the UL resource allocation is within less than the threshold time duration. If the time difference is less than the threshold time duration, the UE may determine that the SRO resources and UL resource allocation occur within the same time period.

For example, as shown in time period $T_2$, there are three SRO resources 1014, 1016, and 1018, each including a respective set of resource elements for different SROs (SRO-5, SRO-6, and SRO-7). Each of the SRO resources 1014, 1016, and 1018 fully overlaps one another and further overlaps at least partially with another UL resource 1022 allocated for other UCI (e.g., ACK bits, CSI bits, etc.). In $T_2$, the UE may identify the subset of SROs for transmission to include all of the SROs (e.g., SRO-5, SRO-6, and SRO-7), and therefore, may not cancel or ignore any of the SROs in $T_2$. The UE may then partition the subset of SROs (SRO-5, SRO-6, and SRO-7) into one or more groups. Here, the SROs are partitioned into a single group 1020. The UE may then generate a single SR bit representing SRO-5, SRO-6, and SRO-7 and append the SR bit to (or concatenate the SR bit with) the UCI prior to encoding and transmission of the combined UL information (e.g., UCI+SR) on the UL resource 1022.

In time period $T_3$, there are four SRO resources 1024, 1026, 1028, and 1030, each including a respective set of resource elements for different SROs (SRO-8, SRO-9, SRO-10, and SRO-11). Several of the SROs overlap at least partially with one another in time, and each of the SROs occur within a threshold time duration of one another. In addition, each of the SROs at least partially overlaps in time with another UL resource 1036 allocated for other UCI (e.g., ACK bits, CSI bits, etc.). In $T_3$, the UE may identify the subset of SROs for transmission to include only SRO-8, SRO-9, and SRO-10, thus canceling or ignoring SRO-11. The UE may then partition the subset of SROs (SRO-8, SRO-9, and SRO-10) into one or more groups. Here, the SROs are partitioned into a first group 1032 including SRO-8 and a second group 1034 including SRO-9 and SRO-10. The UE may then generate a single SR bit for each of the groups 1032 and 1034 and append the SR bits to (or concatenate the SR bits with) the UCI prior to encoding and transmission of the combined UL information (e.g., UCI+SR) on the UL resource 1036.

Again, since there are multiple SR bits generated (one for each of the groups) within $T_3$, the UE may map the respective SRO groups to SR bit locations in an SR bit field to be appended to or concatenated with UCI based on one or more parameters or factors. Examples of such parameters or factors may include the respective priorities of each of the SRO groups, the resources allocated to the SROs in each of the SRO groups, or any other suitable parameter or factor. Although the preceding description refers to the case of one or more SRO s overlapping another PUCCH resource, the same concepts may be used in case of overlap with another UL resource such as PUSCH as well.

Figure 11:
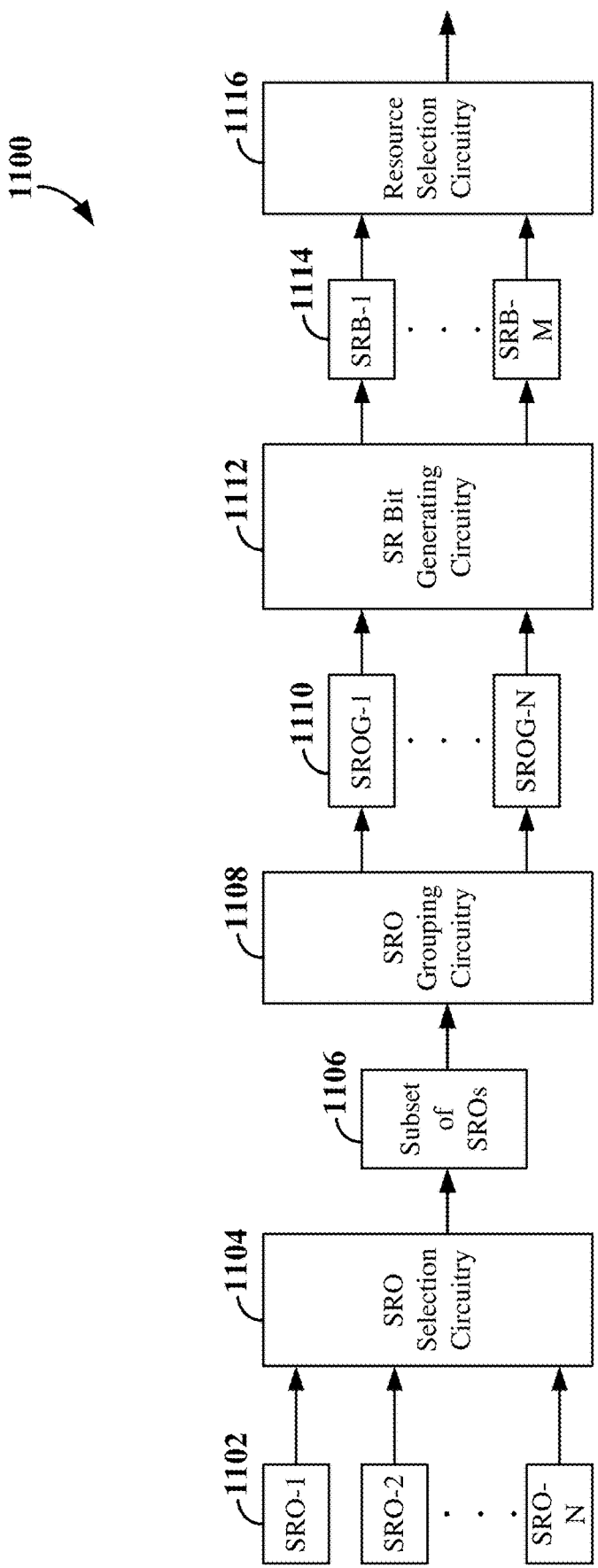
FIG. 11 is a diagram illustrating exemplary SR management circuitry within a scheduled entity for grouping SR opportunities and generating SR bits based on the grouping.

FIG. 11 illustrates exemplary scheduling request (SR) management circuitry 1100 within a scheduled entity for grouping SR opportunities and generating SR bits based on the grouping. The scheduled entity may be a user equipment (UE) as illustrated in any one or more of FIGS. 1 and 2. The SR management circuitry 1100 includes SRO selection circuitry 1104, SRO grouping circuitry 1108, SR bit generating circuitry 1112, and resource selection circuitry 1116.

The SRO selection circuitry 1104 may be configured to determine that respective resources allocated to each of a plurality of scheduling request opportunities (SROs) 1102, e.g., SRO-1, SRO-2, SRO-N, each corresponding to a respective logical channel, are within a same time period. The time period may include, for example, a set of one or more OFDM symbols, a mini-slot, a slot, or a set of slots. In some examples, the SRO selection circuitry 1104 may determine that the SROs occur within the same time period when the SROs at least partially overlaps with one another. In other examples, the SRO selection circuitry 1104 may determine that the SROs occur within the same time period when a respective time difference between the resources allocated to each of the SROs is within less than the threshold time duration. Here, the threshold time duration may be measured in units of time, OFDM symbols, or any other suitable units.

The SRO selection circuitry 1104 may further be configured to select a subset of SROs 1106 (e.g., where the subset includes one or more of the SROs 1102) for transmission during the time period. In some examples, the SRO selection circuitry 1104 may determine the subset of SROs 1106 allowed for transmission based on a suitable set of factors or parameters. For example, the SRO selection circuitry 1104 may identify the subset of SROs 1106 based on one or more of a respective priority of each of the logical channels corresponding to each of the SROs 1106 or the respective resources allocated to each of the SR opportunities.

The SRO grouping circuitry 1108 may be configured to partition the subset of SROs 1106 into one or more groups of SROs 1110 (e.g., SRO group (SROG)-1 ... SROG-N). Each SROG 1110 may include one or more SROs 1102 included in the subset of SROs 1106. In some examples, the SRO grouping circuitry 1108 may partition the subset of SROs 1106 into SROGs 1110 based on one or more of a respective priority of each of the logical channels corresponding to each of the SROs 1106 or the respective resources allocated to each of the SROs 1102 in the subset of SROs 1106.

The SR bit generating circuitry 1112 may be configured to generate a single bit 1114 (e.g., SRB-1 ... SRB-M) for each of the SROGs 1110. For example, the SR bit generating circuitry 1112 may generate a positive SR bit (e.g., a "1") for a given SROG 1110 if UL data is present in a buffer of the scheduled entity for any logical channel corresponding to that SROG 1110. Otherwise, if there is no data for all logical channels corresponding to a given SROG 1110, then the SR bit generating circuitry 1112 may generate a negative SR bit (e.g., a "0") corresponding to that SROG 1110.

If there are multiple SR bits 1114 (e.g., one for each of the SROGs) that are generated, the SR bit generating circuitry 1112 may generate an SR bit field including the multiple SR bits and map between a given SROG 1110 and a particular SR bit (bit location) in the SR bit field. In some examples, the UE may map the respective SROGs 1110 to SR bits 1114 based on one or more of a priority of the logical channels within each SROG or the resources allocated to the SROs 1102 within each of the SROGs 1110.

In some examples, even if one or more SROs 1102 are discarded when selecting the subset of SROs 1106, and even if that subset is partitioned or divided into multiple SROGs 1110, there may nevertheless be more groups 1110 than there are SR bits 1114 available for a UL transmission. When fewer SR bits 1114 are available than SRO groups, the SR bit generating circuitry 1112 may map a subset of group SR status combinations to bit combinations of the available number of SR bits 1114. In this example, each group SR status (for each SROG 1110) indicates either a positive SR status, a negative SR status, or an unknown SR status for that SROG.

For example, assume that there are M bits available for SR transmissions, and there are N>M groups of SROs for the scheduled entity. Here, a UE may utilize a "smart" allocation of $2^M$ SR bit combinations among the possible $2^N$ group SR status combinations.

According to some examples, it may be likely that at most, one SROG will be positive (e.g., have a positive SR) at a time. In this case, the scheduled entity may need only to identify the positive SROG to the scheduling entity. Accordingly, the scheduled entity may need only $M=\text{ceil}(\log_2(N+1))$ SR bits. For N=2 (i.e., there are 2 groups), M=N. However, for N>2, M<N.

For example, assume that N=3 and M=2, with a 2-bit field indicating group SR status combinations {1xx, 01x, 001, 000}. Here, "x" represents an unknown status. In this example, the SR status bits are arranged from most significant bit (MSB) to least significant bit (LSB), in descending priority of SROGs. The SR bit generating circuitry 1112 may generate the SR bits 1114 to first convey whether or not the highest priority SROG is positive. If it is not positive, then the SR bit generating circuitry 1112 may convey whether the next highest priority SROG is positive, etc. For example, the SR bit generating circuitry 1112 may generate the SR bits 1114 with a two-bit field of {11} representing the first group SR status combination (e.g., {1xx}), which indicates that the highest priority SROG is positive. As another example, the SR bit generating circuitry 1112 may generate the SR bits 1114 with a two-bit field of {10} representing the second group SR status combination (e.g., {01x1}), which indicates the second highest priority SROG is positive. Similarly, the SR bit generating circuitry 1112 may generate the SR bits 1114 with a two-bit field of {01} representing the third group SR status combination (e.g., {001}), which indicates the third highest priority SROG is positive. Likewise, the SR bit generating circuitry 1112 may generate the SR bits 1114 with a two-bit field of {00} representing the third group SR status combination (e.g., {000}), which indicates that none of the SROGs are positive.

In general, $\log_2(N+1)$ does not have an integer value. In this case, the ceil( ) operation allows the UE to convey some extra status information. For example, extra bit combinations may cover a case when the highest priority SROG and one more SROG is positive. Thus, the SR bit generating circuitry 1112 may identify which SROG is the other positive group. If still further combinations are allowed, then the SR bit generating circuitry 1112 may go on to identifying cases with 3 positive SROGs 1110, and so on.

For an example where N=4 and M=3, the N+1=5 SR status combinations are {1xxx, 01xx, 001x, 0001, 0000}, but there are $2^M=8$ SR bit combinations. So, if the first SROG 1110 is positive, the SR bit generating circuitry 1112 can identify the second positive SROG accordingly: {1000, 01xx, 001x, 0001, 0000, 11xx, 101x, 1001}. In this example, the SR bit generating circuitry 1112 may calculate the number of SR bits based on the binary logarithm of one greater than the number of SROGs (e.g., $M=\text{ceil}(\log 2(N+1))=3$). The SR bit generating circuitry 1112 may then identify a first subset of group SR status combinations (e.g., {1000, 01xx, 001x, 0001, 0000} using the example above), where the first subset of group SR status combinations includes a first number of group SR status combinations equal to one greater than the number of SROGs and each of the first subset of group SR status combinations indicates a respective SR status (positive SR status, negative SR status, or unknown SR status) for each of the SROGs based on the respective priorities of each of the SROGs. The SR bit generating circuitry 1112 may then identify a second subset of group SR status combinations (e.g., {11xx, 101x, 1001} using the above example) different than the first subset of group SR status combinations, where the second subset of group SR status combinations includes a second number of group SR status combinations equal to a difference between the number of bits combinations (e.g., $2^M=8$, where M=3) of the SR bits and the first number of group SR status combinations.

Such a scheme may be applied for any M<N, not necessarily $M=\text{ceil}(\log 2(N+1))$. More generally, an interpretation of the mapping between the $2^M$ SR bit combinations and subsets of the $2^N$ possible SR status combinations can be pre-agreed between the scheduled and scheduling entity either by specifying it in the communications standard or by RRC configuration.

The resource selection circuitry 1116 may be configured to select one of the resources (e.g., time-frequency resources) assigned to an SRO 1102 in the subset of SROs 1106 or to another UL resource occurring within the same time period that is allocated for other UCI for transmission of the SR bits 1114. In examples in which multiple SR bits 1114 are generated and transmitted on one of the SRO resources, the selected SRO resource may implicitly use a different PUCCH transmission format, so as to be able to carry the increased number of bits.

Figure 12:
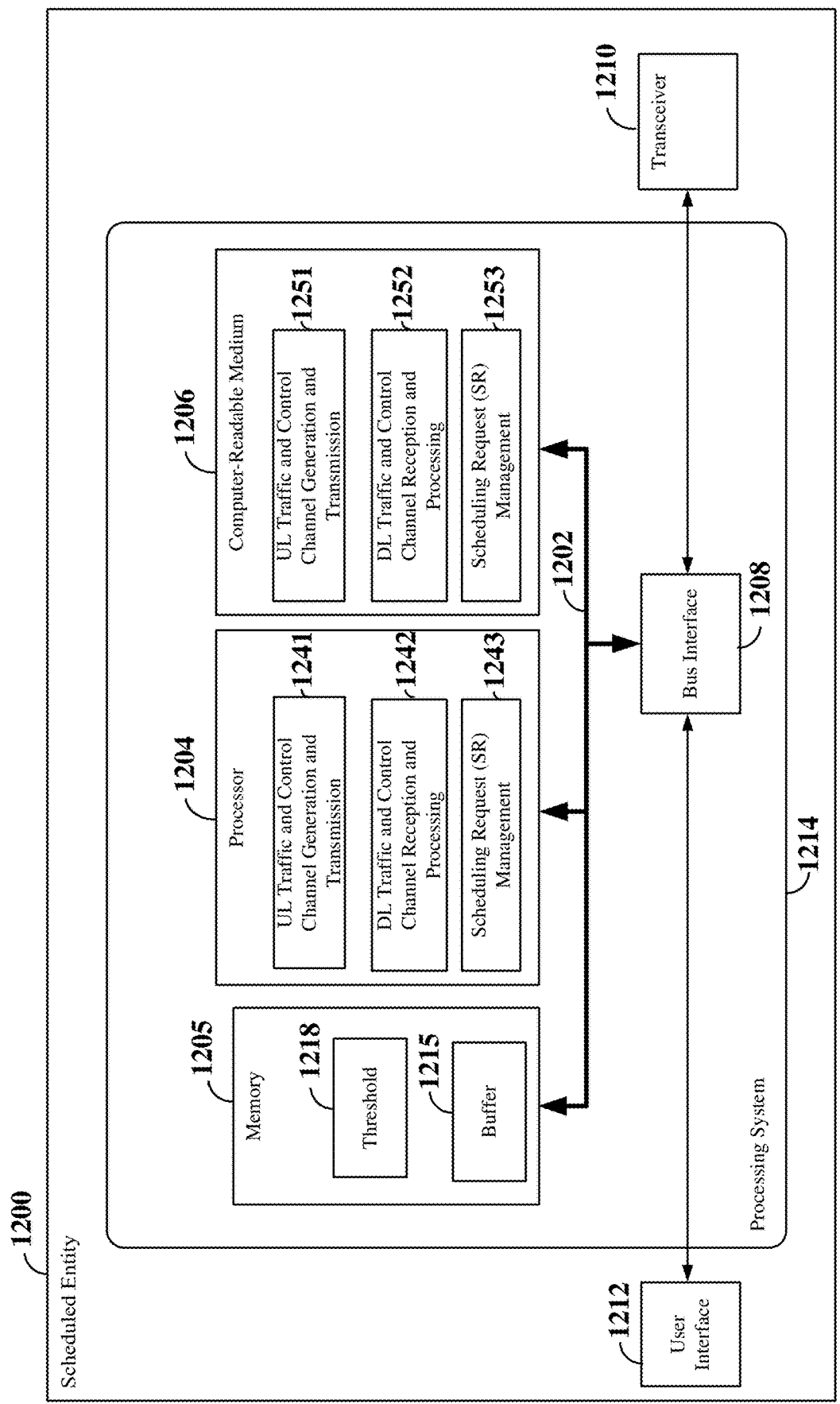
FIG. 12 is a block diagram conceptually illustrating an example of a hardware implementation for a scheduled entity.

FIG. 12 is a conceptual diagram illustrating an example of a hardware implementation for an exemplary scheduled entity 1200 employing a processing system 1214. For example, the scheduled entity 1200 may be a user equipment (UE) as illustrated in any one or more of FIGS. 1 and 2.

The scheduled entity 1200 may be implemented with a processing system 1214 that includes one or more processors 1204. Examples of processors 1204 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduled entity 1200 may be configured to perform any one or more of the functions described herein. That is, the processor 1204, as utilized in a scheduled entity 1200, may be used to implement any one or more of the processes described below. The processor 1204 may in some instances be implemented via a baseband or modem chip and in other implementations, the processor 1204 may itself comprise a number of devices distinct and different from a baseband or modem chip (e.g., in such scenarios is may work in concert to achieve embodiments discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1214 may be implemented with a bus architecture, represented generally by the bus 1202. The bus 1202 may include any number of interconnecting buses and bridges depending on the specific application of the processing system 1214 and the overall design constraints. The bus 1202 communicatively couples together various circuits including one or more processors (represented generally by the processor 1204), a memory 1205, and computer-readable media (represented generally by the computer-readable medium 1206). The bus 1202 may also link various other circuits such as timing sources, peripherals, voltage regulators, and power management circuits, which are well known in the art, and therefore, will not be described any further. A bus interface 1208 provides an interface between the bus 1202 and a transceiver 1210. The transceiver 1210 provides a means for communicating with various other apparatus over a transmission medium (e.g., air interface). Depending upon the nature of the apparatus, a user interface 1212 (e.g., keypad, display, speaker, microphone, joystick) may also be provided.

The processor 1204 is responsible for managing the bus 1202 and general processing, including the execution of software stored on the computer-readable medium 1206. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on the computer-readable medium 1206. The software, when executed by the processor 1204, causes the processing system 1214 to perform the various functions described below for any particular apparatus. The computer-readable medium 1206 and the memory 1205 may also be used for storing data that is manipulated by the processor 1204 when executing software.

The computer-readable medium 1206 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 1206 may reside in the processing system 1214, external to the processing system 1214, or distributed across multiple entities including the processing system 1214. The computer-readable medium 1206 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1204 may include circuitry configured for various functions. For example, the processor 1204 may include uplink (UL) traffic and control channel generation and transmission circuitry 1241, configured to generate and transmit uplink control/feedback/acknowledgement information on an UL control channel (e.g., a PUCCH) or UL traffic channel (e.g., a PUSCH). The UL traffic and control channel generation and transmission circuitry 1241 may further be configured to generate and transmit uplink user data traffic on an UL traffic channel (e.g., a PUSCH). For example, the UL traffic and control channel generation and transmission circuitry 1241 may be configured to transmit one or more scheduling request (SR) bits representing two or more logical channels (e.g., two or more SR opportunities) on a single UL resource within a particular time period (e.g., OFDM symbol(s), mini-slot, or slot). The UL traffic and control channel generation and transmission circuitry 1241 may further be configured to execute UL traffic and control channel generation and transmission software 1251 stored in the computer-readable medium 1206 to implement one or more of the functions described herein.

The processor 1204 may further include downlink (DL) traffic and control channel reception and processing circuitry 1242, configured for receiving and processing downlink user data traffic on a traffic channel, and to receive and process control information on one or more downlink control channels or higher layer signaling. For example, the DL traffic and control channel reception and processing circuitry 1242 may be configured to receive one or more semi-static SR resource grants, each associated with a different respective logical channel (e.g., type of traffic). The DL traffic and control channel reception and processing circuitry 1242 may further be configured to execute DL traffic and control channel reception and processing software 1252 stored in the computer-readable medium 1206 to implement one or more of the functions described herein.

The processor 1204 may further include scheduling request (SR) management circuitry 1243, configured for determining that the respective resources allocated to a plurality of SR opportunities occur within the same time period, identifying a subset of the plurality of SR opportunities and partitioning the subset of SR opportunities into one or more groups of SR opportunities. The SR management circuitry 1243 is further configured for generating one or more SR bits representing the one or more groups of SR opportunities and selecting a resource (e.g., time-frequency resources corresponding to one or more resource elements) for transmitting the SR bits. In some examples, the selected resource may be one of the resources allocated to an SR opportunity in the subset of SR opportunities. In other examples, the selected resource may be another UL resource allocated for other UCI. The SR management circuitry 1243 is further configured for providing the generated SR bits and an indication of the selected resource to the UL traffic and control channel generation and transmission circuitry 1241 for generation and transmission of an uplink control channel (e.g., PUCCH) or uplink traffic channel (e.g., PUCCH) containing the SR bits.

In some examples, the SR management circuitry 1243 may be configured to determine that the respective resources allocated to the plurality of SR opportunities occur with the same time period when each of the plurality of SR opportunities fully or partially overlaps with one another in time. In other examples, the SR management circuitry 1243 may utilize a threshold time duration 1218 to determine whether the respective resources allocated to the plurality of SR opportunities occur with the same time period. For example, the SR management circuitry 1243 may determine that the respective resources allocated to the plurality of SR opportunities occur within the same time period when the time difference between each of the respective resources is within less than the threshold time duration 1218.

In some examples, the SR management circuitry 1243 may identify the subset of SR opportunities based on a suitable set of factors or parameters. For example, the SR management circuitry 1243 may identify the subset of SR opportunities based on one or more of a respective priority of each of the logical channels or the respective resources allocated to each of the SR opportunities. The subset of SR opportunities may include all or only a portion of the plurality of SR opportunities. In addition, the SR management circuitry 1243 may partition the subset of SR opportunities into the one or more groups of SR opportunities based on one or more of a respective priority of each of the logical channels or the respective resources allocated to each of the SR opportunities in the subset of SR opportunities. Each group of SR opportunities may include one or more SR opportunities included in the subset of SR opportunities.

In some examples, the SR management circuitry 1243 may generate one or more SR bits representing the one or more SR groups. For example, the SR management circuitry 1243 may generate a positive SR bit (e.g., a "1") for a given group of SR opportunities if UL data is present in a buffer 1215 of the scheduled entity 1200 for any logical channel corresponding to that group. Otherwise, if there is no data for all logical channels corresponding to a given group, then the SR management circuitry 1243 may generate a negative SR bit (e.g., a "0") corresponding to that group. If there are multiple SR bits (e.g., one for each of the groups) that are generated, the SR management circuitry 1243 may generate an SR bit field including the multiple SR bits and map between a given group and a particular SR bit (bit location) in the SR bit field. In some examples, when fewer SR bits are available than groups, the SR management circuitry 1243 may map a subset of group SR status combinations to bit combinations of the available number of SR bits.

In some examples, the SR management circuitry 1243 may be the SR management circuitry 1100 shown in FIG. 11. The SR management circuitry 1243 may further be configured to execute SR management software 1253 stored on the computer-readable medium 1206 to implement one or more of the functions described here.

Figure 13:
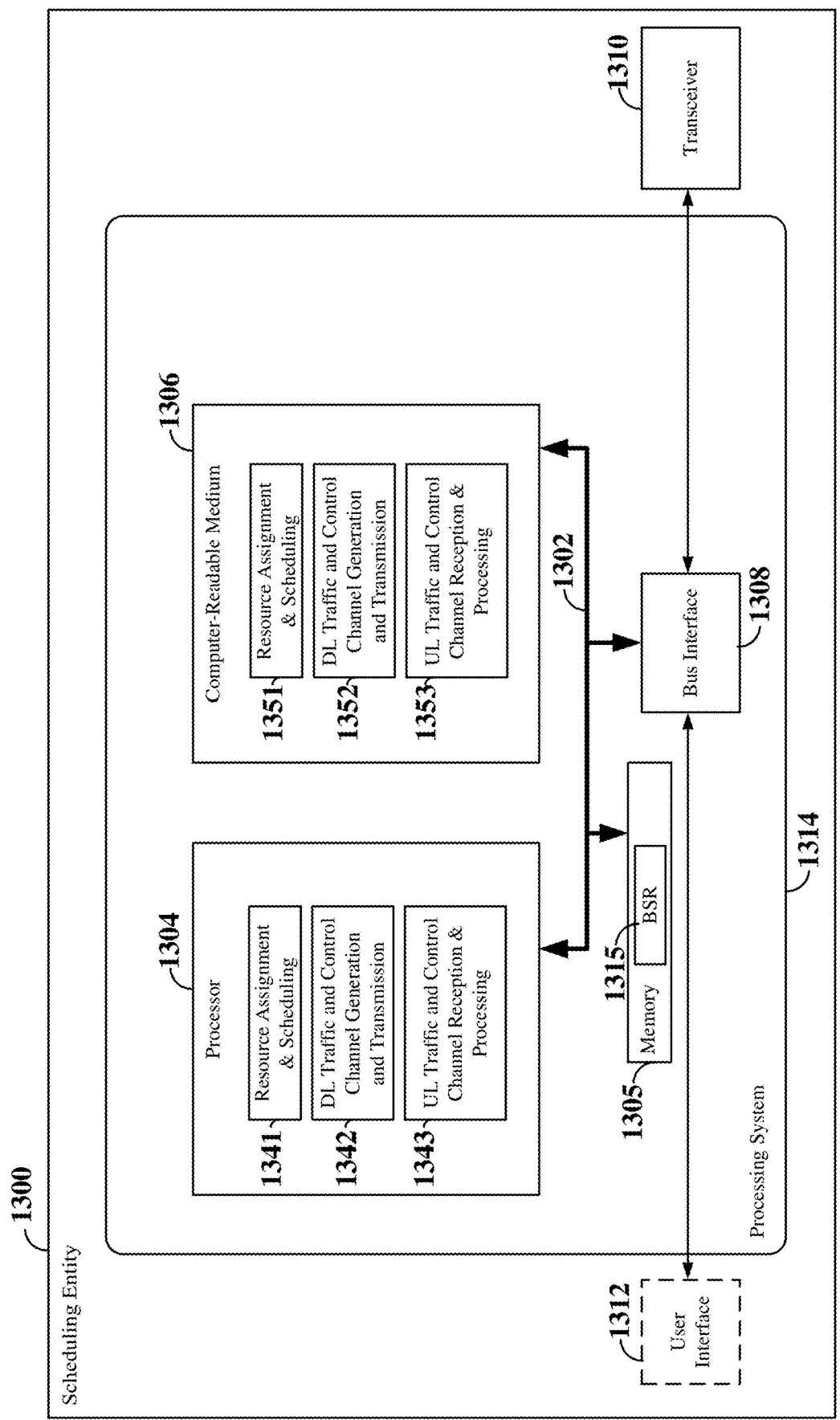
FIG. 13 is a block diagram conceptually illustrating an example of a hardware implementation for a scheduling entity.

FIG. 13 is a conceptual diagram illustrating an example of a hardware implementation for an exemplary scheduling entity 1300 employing a processing system 1314. In accordance with various aspects of the disclosure, an element, or any portion of an element, or any combination of elements may be implemented with a processing system 1314 that includes one or more processors 1304. For example, the scheduling entity 1300 may be a next generation (5G) base station as illustrated in any one or more of FIGS. 1 and 2. In another example, the scheduling entity 1300 may be a user equipment (UE) as illustrated in any one or more of FIGS. 1 and 2.

The processing system 1314 may be substantially the same as the processing system 1214 illustrated in FIG. 12, including a bus interface 1308, a bus 1302, memory 1305, a processor 1304, and a computer-readable medium 1306. Furthermore, the scheduling entity 1300 may optionally include a user interface 1312 (depending on the nature of the apparatus) and may further include a transceiver 1310 substantially similar to those described above in FIG. 12. That is, the processor 1304, as utilized in a scheduling entity 1300, may be used to implement any one or more of the processes described below.

In some aspects of the disclosure, the processor 1304 may include resource assignment and scheduling circuitry 1341, configured to generate, schedule, and modify a resource assignment or grant of time-frequency resources (e.g., a set of one or more resource elements). For example, the resource assignment and scheduling circuitry 1341 may schedule time-frequency resources within a plurality of time division duplex (TDD) and/or frequency division duplex (FDD) subframes, slots, and/or mini-slots to carry data and/or control information to and/or from multiple UEs (scheduled entities).

In various aspects of the disclosure, the resource assignment and scheduling circuitry 1341 may be configured to schedule multiple scheduling request (SR) resources, each for a different respective logical channel, for a single scheduled entity within a particular time period. In addition, the resource assignment and scheduling circuitry 1341 may further be configured to schedule an UL resource for additional uplink control information (UCI) to be transmitted by the scheduled entity within a physical uplink control channel (PUCCH) during the time period. Furthermore, in response to receiving a scheduling request (SR) for one or more of the logical channels, the resource assignment and scheduling circuitry 1341 may further be configured to schedule additional UL resources for the scheduled entity to transmit traffic associated with the requesting logical channel(s). The resource assignment and scheduling circuitry 1341 may further be configured to execute resource assignment and scheduling software 1351 stored on the computer-readable medium 1306 to implement one or more of the functions described herein.

The processor 1304 may further include downlink (DL) traffic and control channel generation and transmission circuitry 1342, configured to generate and transmit downlink user data traffic and control channels within one or more subframes, slots, and/or mini-slots. The DL traffic and control channel generation and transmission circuitry 1342 may operate in coordination with the resource assignment and scheduling circuitry 1341 to place the DL user data traffic and/or control information onto a time division duplex (TDD) or frequency division duplex (FDD) carrier by including the DL user data traffic and/or control information within one or more subframes, slots, and/or mini-slots in accordance with the resources assigned to the DL user data traffic and/or control information. For example, the DL traffic and control channel generation and transmission circuitry 1342 may be configured to generate radio resource control (RRC) signaling including one or more semi-persistent grants of respective uplink resources for a scheduled entity to transmit periodic scheduling requests for one or more logical channels. The DL traffic and control channel generation and transmission circuitry 1342 may further be configured to execute DL traffic and control channel generation and transmission software 1352 store on the computer-readable medium to implement one or more of the functions described herein.

The processor 1304 may further include uplink (UL) traffic and control channel reception and processing circuitry 1343, configured to receive and process uplink control channels and uplink traffic channels from one or more scheduled entities. For example, the UL traffic and control channel reception and processing circuitry 1343 may be configured to receive one or more SR bits representing two or more SR opportunities, each corresponding to a respective logical channel, from a scheduled entity on a single UL resource allocated to the scheduled entity. If one of the SR bits represents two or more SR opportunities (e.g., a single SR bit represents a group of two or more SR opportunities), the UL traffic and control channel reception and processing circuitry 1343 may not realize which logical channel(s) represented by the single SR bit actually have data to transmit. In some examples, the UL traffic and control channel reception and processing circuitry 1343, in combination with the resource assignment and scheduling circuitry 1341, may schedule resources for all logical channels in that group. In other examples, the UL traffic and control channel reception and processing circuitry 1343, in combination with the resource assignment and scheduling circuitry 1341, may take into account other information, such as a buffer status report (BSR) 1315 corresponding to the respective logical channels or traffic types received from the scheduled entity, to determine which logical channels among that group of logical channels (group of SR opportunities) should have UL resources scheduled.

The UL traffic and control channel reception and processing circuitry 1343 may further be configured to receive uplink user data traffic from one or more scheduled entities. In addition, the UL traffic and control channel reception and processing circuitry 1343 may operate in coordination with the resource assignment and scheduling circuitry 1341 to schedule UL user data traffic transmissions, DL user data traffic transmissions and/or DL user data traffic retransmissions in accordance with the received UCI. The UL traffic and control channel reception and processing circuitry 1343 may further be configured to execute UL traffic and control channel reception and processing software 1353 stored on the computer-readable medium 1306 to implement one or more of the functions described herein.

Figure 14:
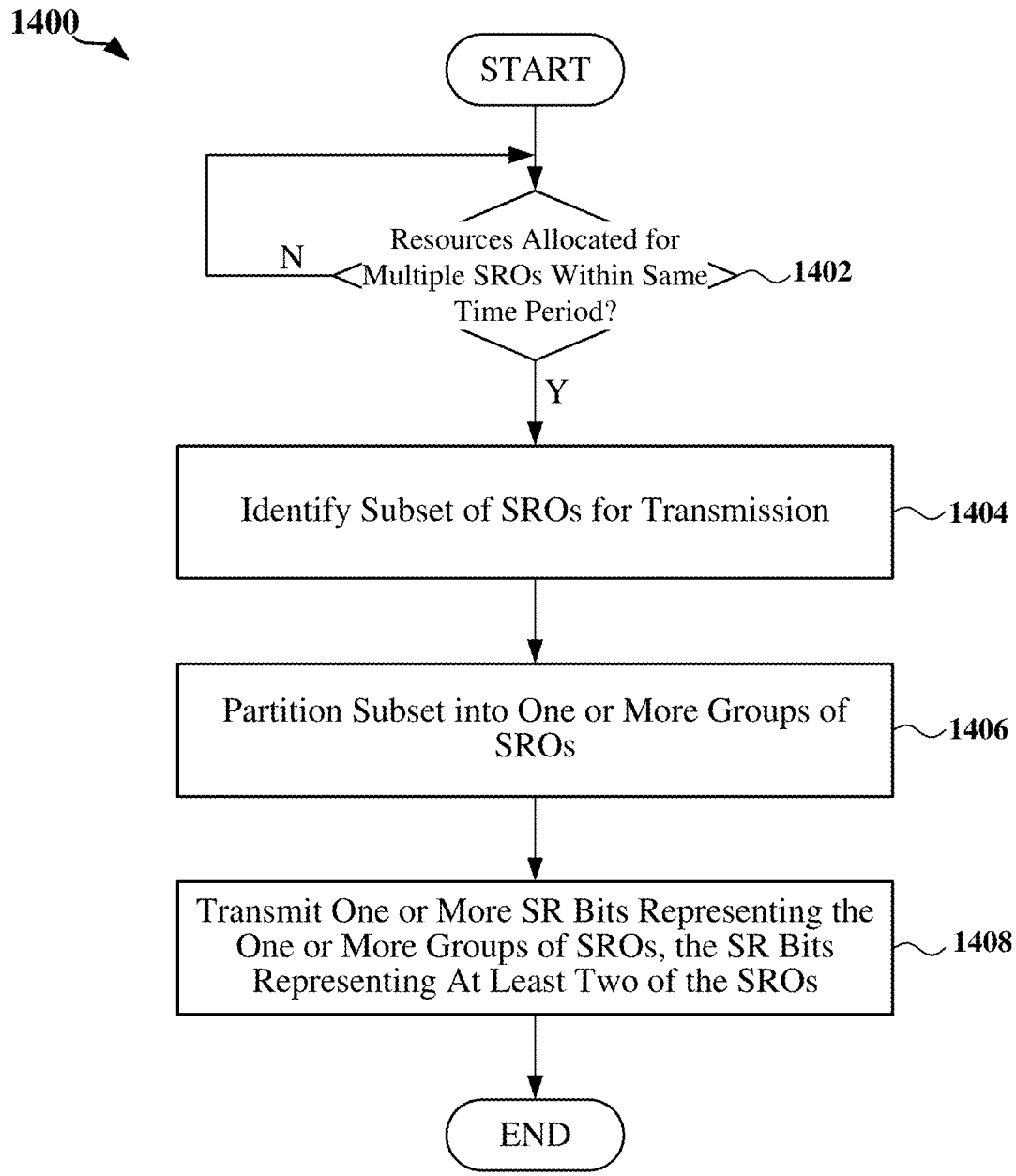
FIG. 14 is a flow chart illustrating an exemplary process for determining resources for an SR transmission.

FIG. 14 is a flow chart illustrating an exemplary process 1400 for determining resources for an SR transmission. As described below, some or all illustrated features may be omitted in a particular implementation within the scope of the present disclosure, and some illustrated features may not be required for implementation of all embodiments. In some examples, the process 1400 may be carried out by the scheduled entity illustrated in FIG. 12. In some examples, the process 1400 may be carried out by any suitable apparatus or means for carrying out the functions or algorithm described below.

At block 1402, the scheduled entity may determine whether resources have been allocated for multiple SR opportunities within the same time period. For example, the scheduled entity may determine that the resources allocated to each of the SR opportunities fully or partially overlaps with one another in time or that the respective time difference between each of the resources allocated to the multiple SR opportunities is within less than a threshold time duration. For example, the SR management circuitry 1243 shown and described above in reference to FIG. 12 may determine whether resources have been allocated for multiple SR opportunities within the same time period.

If resources have been allocated to multiple SR opportunities within the same time period (Y branch of block 1402), at block 1404, the scheduled entity may identify a subset of the plurality of SR opportunities for transmission. In some examples, the scheduled entity may identify the subset of SR opportunities based on a suitable set of factors or parameters. For example, the scheduled entity may identify the subset of SR opportunities based on one or more of a respective priority of each of the logical channels or the respective resources allocated to each of the SR opportunities. The subset of SR opportunities may include all or only a portion of the plurality of SR opportunities. For example, the SR management circuitry 1243 shown and described above in reference to FIG. 12 may identify the subset of SR opportunities.

At block 1406, the scheduled entity may partition the subset of SR opportunities into one or more groups of SR opportunities. In some examples, the scheduled entity may partition the subset of SR opportunities into the one or more groups of SR opportunities based on one or more of a respective priority of each of the logical channels or the respective resources allocated to each of the SR opportunities in the subset of SR opportunities. Each group of SR opportunities may include one or more SR opportunities included in the subset of SR opportunities. For example, the SR management circuitry 1243 shown and described above in reference to FIG. 12 may partition the subset of SR opportunities into one or more groups of SR opportunities.

At block 1408, the scheduled entity may transmit one or more SR bits representing the one or more groups of SR opportunities to the scheduling entity on a single UL resource allocated to the scheduled entity. The one or more SR bits represents at least two of the SR opportunities. In some examples, the scheduled entity may generate a respective single bit for each group of SR opportunities and either transmit all of the SR bits together on one of the UL resources allocated to one of the SR opportunities in the subset or may append the SR bits to other uplink control information (UCI) scheduled for transmission within the same time period and transmit the combined UL information (UCI+SR) within the UL resource allocated to the UCI. In other examples, the scheduled entity may generate a fewer number of SR bits than groups based on a "smart" mapping between group SR status combinations and possible SR bit combinations. For example, the SR management circuitry 1243, together with the UL traffic and control channel generation and transmission circuitry 1241 and transceiver 1210, may transmit the SR bits to the scheduling entity.

Figure 15:
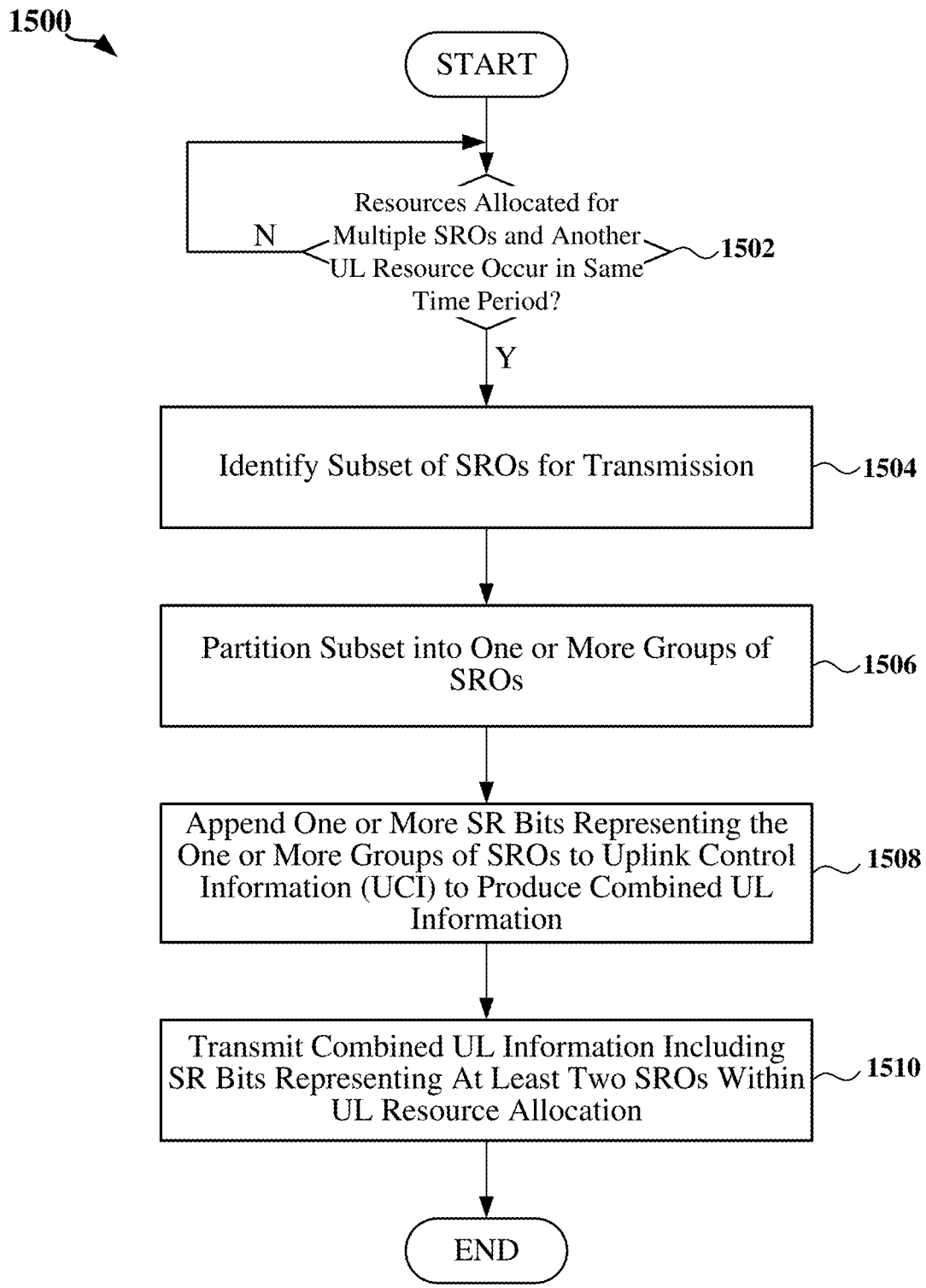
FIG. 15 is a flow chart illustrating another exemplary process for determining resources for an SR transmission.

FIG. 15 is a flow chart illustrating another exemplary process 1500 for determining resources for an SR transmission. As described below, some or all illustrated features may be omitted in a particular implementation within the scope of the present disclosure, and some illustrated features may not be required for implementation of all embodiments. In some examples, the process 1500 may be carried out by the scheduled entity illustrated in FIG. 12. In some examples, the process 1500 may be carried out by any suitable apparatus or means for carrying out the functions or algorithm described below.

At block 1502, the scheduled entity may determine whether resources have been allocated for multiple SR opportunities within the same time period, along with another UL resource (e.g., for other uplink control information (UCI)). For example, the scheduled entity may determine that the resources allocated to each of the SR opportunities and the other UL resource fully or partially overlaps with one another in time or that the respective time difference between each of the resources allocated to the multiple SR opportunities and the other UL resource is within less than a threshold time duration. For example, the SR management circuitry 1243 shown and described above in reference to FIG. 12 may determine whether resources have been allocated for multiple SR opportunities within the same time period.

If resources have been allocated to multiple SR opportunities, along with another UL resource, within the same time period (Y branch of block 1502), at block 1504, the scheduled entity may identify a subset of SR opportunities. In some examples, the scheduled entity may identify the subset of SR opportunities based on a suitable set of factors or parameters. For example, the scheduled entity may identify the subset of SR opportunities based on one or more of a respective priority of each of the logical channels or the respective resources allocated to each of the SR opportunities. The subset of SR opportunities may include all or only a portion of the plurality of SR opportunities. For example, the SR management circuitry 1243 shown and described above in reference to FIG. 12 may identify the subset of SR opportunities.

At block 1506, the scheduled entity may partition the subset of SR opportunities into one or more groups of SR opportunities. In some examples, the scheduled entity may partition the subset of SR opportunities into the one or more groups of SR opportunities based on one or more of a respective priority of each of the logical channels or the respective resources allocated to each of the SR opportunities in the subset of SR opportunities. Each group of SR opportunities may include one or more SR opportunities included in the subset of SR opportunities. For example, the SR management circuitry 1243 shown and described above in reference to FIG. 12 may partition the subset of SR opportunities into one or more groups of SR opportunities.

At block 1508, the scheduled entity may append one or more SR bits representing the one or more groups of SR opportunities to uplink control information (UCI) scheduled within the same duration of time to produce combined UL information. The one or more SR bits represents at least two of the SR opportunities. In some examples, the scheduled entity may generate a respective single bit for each group of SR opportunities and append all of the SR bits to the other UCI. In other examples, the scheduled entity may generate a fewer number of SR bits than groups based on a "smart" mapping between group SR status combinations and possible SR bit combinations and append the reduced number of SR bits to the other UCI. For example, the SR management circuitry 1243, together with the UL traffic and control channel generation and transmission circuitry 1241, may append the SR bits to the UCI to produce the combined UL information.

At block 1510, the scheduled entity may transmit the combined UL information to the scheduling entity within the UL resource allocated to the UCI. For example, the SR management circuitry 1243, together with the UL traffic and control channel generation and transmission circuitry 1241 and transceiver 1210, may transmit the SR bits to the scheduling entity.

Figure 16:
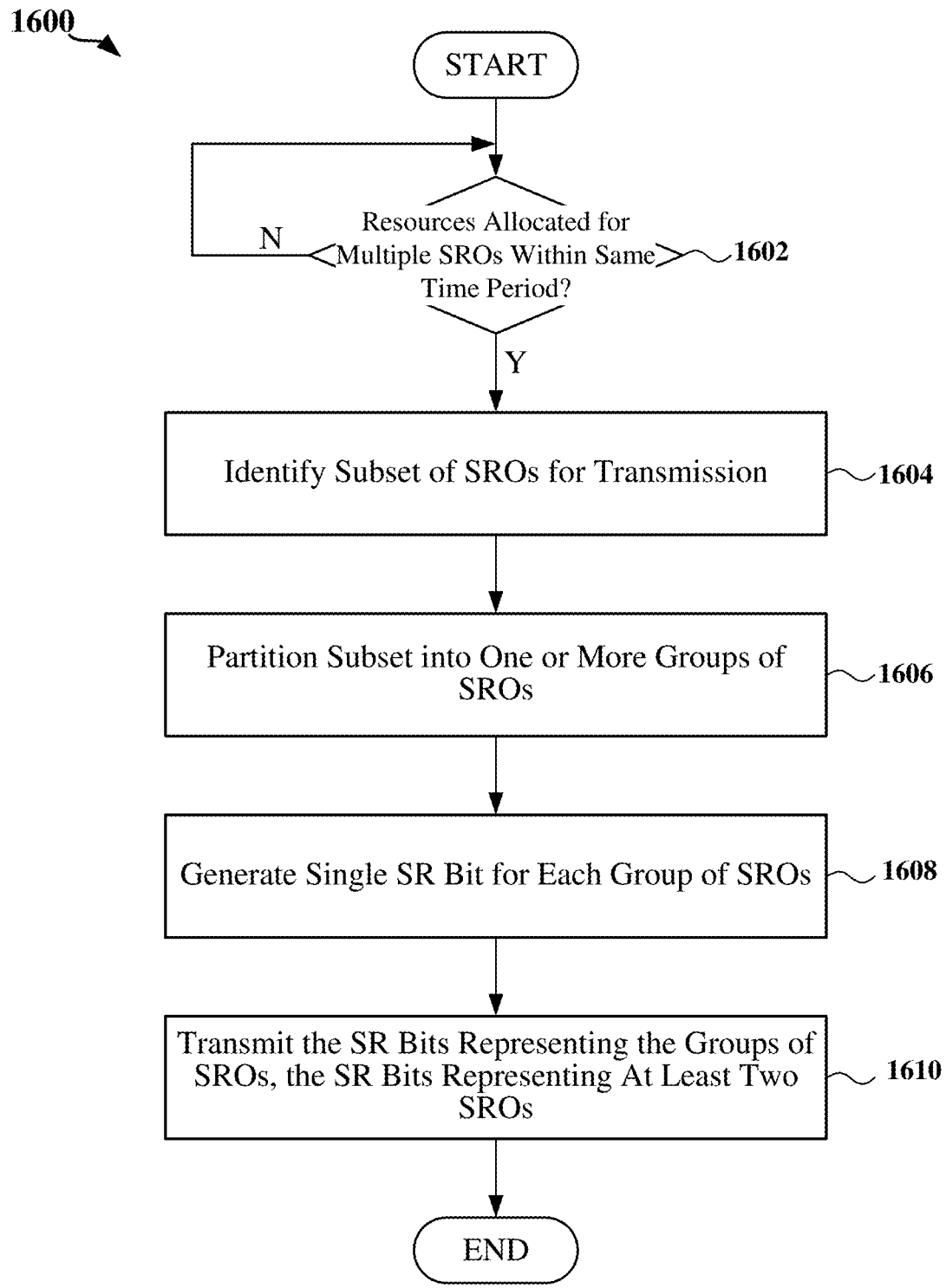
FIG. 16 is a flow chart illustrating another exemplary process for determining resources for an SR transmission.

FIG. 16 is a flow chart illustrating an exemplary process 1600 for determining resources for an SR transmission. As described below, some or all illustrated features may be omitted in a particular implementation within the scope of the present disclosure, and some illustrated features may not be required for implementation of all embodiments. In some examples, the process 1600 may be carried out by the scheduled entity illustrated in FIG. 12. In some examples, the process 1600 may be carried out by any suitable apparatus or means for carrying out the functions or algorithm described below.

At block 1602, the scheduled entity may determine whether resources have been allocated for multiple SR opportunities within the same time period. For example, the scheduled entity may determine that the resources allocated to each of the SR opportunities fully or partially overlaps with one another in time or that the respective time difference between each of the resources allocated to the multiple SR opportunities is within less than a threshold time duration. For example, the SR management circuitry 1243 shown and described above in reference to FIG. 12 may determine whether resources have been allocated for multiple SR opportunities within the same time period.

If resources have been allocated to multiple SR opportunities within the same time period (Y branch of block 1602), at block 1604, the scheduled entity may identify a subset of SR opportunities. In some examples, the scheduled entity may identify the subset of SR opportunities based on a suitable set of factors or parameters. For example, the scheduled entity may identify the subset of SR opportunities based on one or more of a respective priority of each of the logical channels or the respective resources allocated to each of the SR opportunities. The subset of SR opportunities may include all or only a portion of the plurality of SR opportunities. For example, the SR management circuitry 1243 shown and described above in reference to FIG. 12 may identify the subset of SR opportunities.

At block 1606, the scheduled entity may partition the subset of SR opportunities into one or more groups of SR opportunities. In some examples, the scheduled entity may partition the subset of SR opportunities into the one or more groups of SR opportunities based on one or more of a respective priority of each of the logical channels or the respective resources allocated to each of the SR opportunities in the subset of SR opportunities. Each group of SR opportunities may include one or more SR opportunities included in the subset of SR opportunities. For example, the SR management circuitry 1243 shown and described above in reference to FIG. 12 may partition the subset of SR opportunities into one or more groups of SR opportunities.

At block 1608, the scheduled entity may generate a respective single SR bit for each group of SR opportunities. For example, the scheduled entity may generate a positive SR bit (e.g., a "1") for a given group of SR opportunities if UL data is present in a buffer of the scheduled entity for any logical channel corresponding to that group. Otherwise, if there is no data for all logical channels corresponding to a given group, then the scheduled entity may generate a negative SR bit (e.g., a "0") corresponding to that group. If there are multiple SR bits (e.g., one for each of the groups) that are generated, the scheduled entity may generate an SR bit field including the multiple SR bits and map between a given group and a particular SR bit (bit location) in the SR bit field. For example, the SR management circuitry 1243 shown and described above in reference to FIG. 12 may generate the SR bits.

At block 1610, the scheduled entity may transmit the one or more SR bits representing the one or more groups of SR opportunities to the scheduling entity on a single UL resource allocated to the scheduled entity. The one or more SR bits represents at least two of the SR opportunities. In some examples, the scheduled entity may transmit all of the SR bits together on one of the UL resources allocated to one of the SR opportunities in the subset or may append the SR bits to other uplink control information (UCI) scheduled for transmission within the same time period and transmit the combined UL information (UCI+SR) on the UL resource allocated to the UCI. For example, the SR management circuitry 1243, together with the UL traffic and control channel generation and transmission circuitry 1241 and transceiver 1210, may transmit the SR bits to the scheduling entity.

Figure 17:
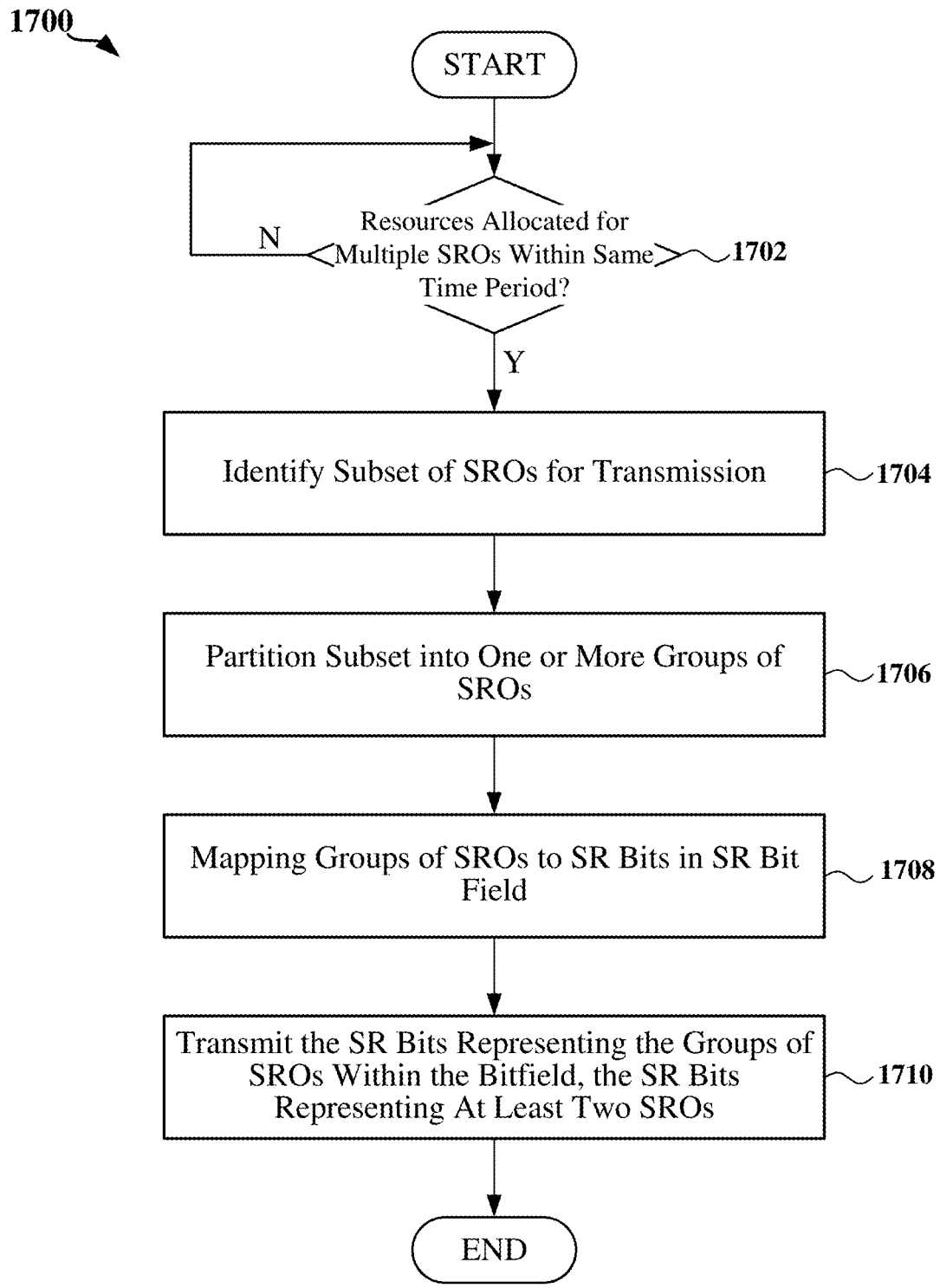
FIG. 17 is a flow chart illustrating another exemplary process for determining resources for an SR transmission.

FIG. 17 is a flow chart illustrating an exemplary process 1700 for determining resources for an SR transmission. As described below, some or all illustrated features may be omitted in a particular implementation within the scope of the present disclosure, and some illustrated features may not be required for implementation of all embodiments. In some examples, the process 1700 may be carried out by the scheduled entity illustrated in FIG. 12. In some examples, the process 1700 may be carried out by any suitable apparatus or means for carrying out the functions or algorithm described below.

At block 1702, the scheduled entity may determine whether resources have been allocated for multiple SR opportunities within the same time period. For example, the scheduled entity may determine that the resources allocated to each of the SR opportunities fully or partially overlaps with one another in time or that the respective time difference between each of the resources allocated to the multiple SR opportunities is within less than a threshold time duration. In one example where the resources allocated to the plurality of SR opportunities fully or partially overlap, the scheduled entity determines that respective resources allocated to each of the plurality of SR opportunities are within the same time period. As noted elsewhere herein, for example, with reference to SRO selection circuitry 1104 of FIG. 11, the SR opportunities each correspond to a respective one of a plurality of logical channels. For example, the SR management circuitry 1243 shown and described above in reference to FIG. 12 may determine whether resources have been allocated for multiple SR opportunities within the same time period.

If resources have been allocated to multiple SR opportunities within the same time period (Y branch of block 1702), at block 1704, the scheduled entity may identify a subset of the plurality of SR opportunities for transmission. In some examples, the scheduled entity may identify the subset of SR opportunities based on a suitable set of factors or parameters. For example, the scheduled entity may identify the subset of SR opportunities based on one or more of a respective priority of each of the logical channels or the respective resources allocated to each of the SR opportunities. The subset of SR opportunities may include all or only a portion of the plurality of SR opportunities. For example, the SR management circuitry 1243 shown and described above in reference to FIG. 12 may identify the subset of SR opportunities.

At block 1706, the scheduled entity may partition the subset of SR opportunities into one or more groups of SR opportunities, where each group of SR opportunities comprises one or more SR opportunities. In some examples where the subset of the plurality of SR opportunities is partitioned into one group of SR opportunities, the one group of SR opportunities includes at least two SR opportunities. In some examples, the scheduled entity may partition the subset of SR opportunities into the one or more groups of SR opportunities based on one or more of a respective priority of each of the logical channels or the respective resources allocated to each of the SR opportunities in the subset of SR opportunities. Each group of SR opportunities may include one or more SR opportunities included in the subset of SR opportunities. For example, the SR management circuitry 1243 shown and described above in reference to FIG. 12 may partition the subset of SR opportunities into one or more groups of SR opportunities.

At block 1708, the scheduled entity may map the groups of SR opportunities to SR bits (bit locations) in an SR bit field. In some examples, the scheduled entity may map the respective groups of SR opportunities to SR bits in the SR bit field based on one or more of a priority of the logical channels within each group or the resources allocated to the SR opportunities within each of the groups. For example, the SR management circuitry 1243 shown and described above in reference to FIG. 12 may map the groups of SR opportunities to SR bits.

At block 1710, the scheduled entity may transmit the SR bits representing the groups of SR opportunities to the scheduling entity on a single UL resource allocated to the scheduled entity. The SR bits represent at least two of the SR opportunities. In some examples, the scheduled entity may generate a respective single bit for each group of SR opportunities and either transmit all of the SR bits together on one of the UL resources allocated to one of the SR opportunities in the subset (utilizing the mapped SR bit field) or may append the SR bits to other uplink control information (UCI) scheduled for transmission within the same time period (utilizing the mapped SR bit field) and transmit the combined UL information (UCI+SR) within the UL resource allocated to the UCI. For example, the SR management circuitry 1243, together with the UL traffic and control channel generation and transmission circuitry 1241 and transceiver 1210, may transmit the SR bits to the scheduling entity.

Figure 18:
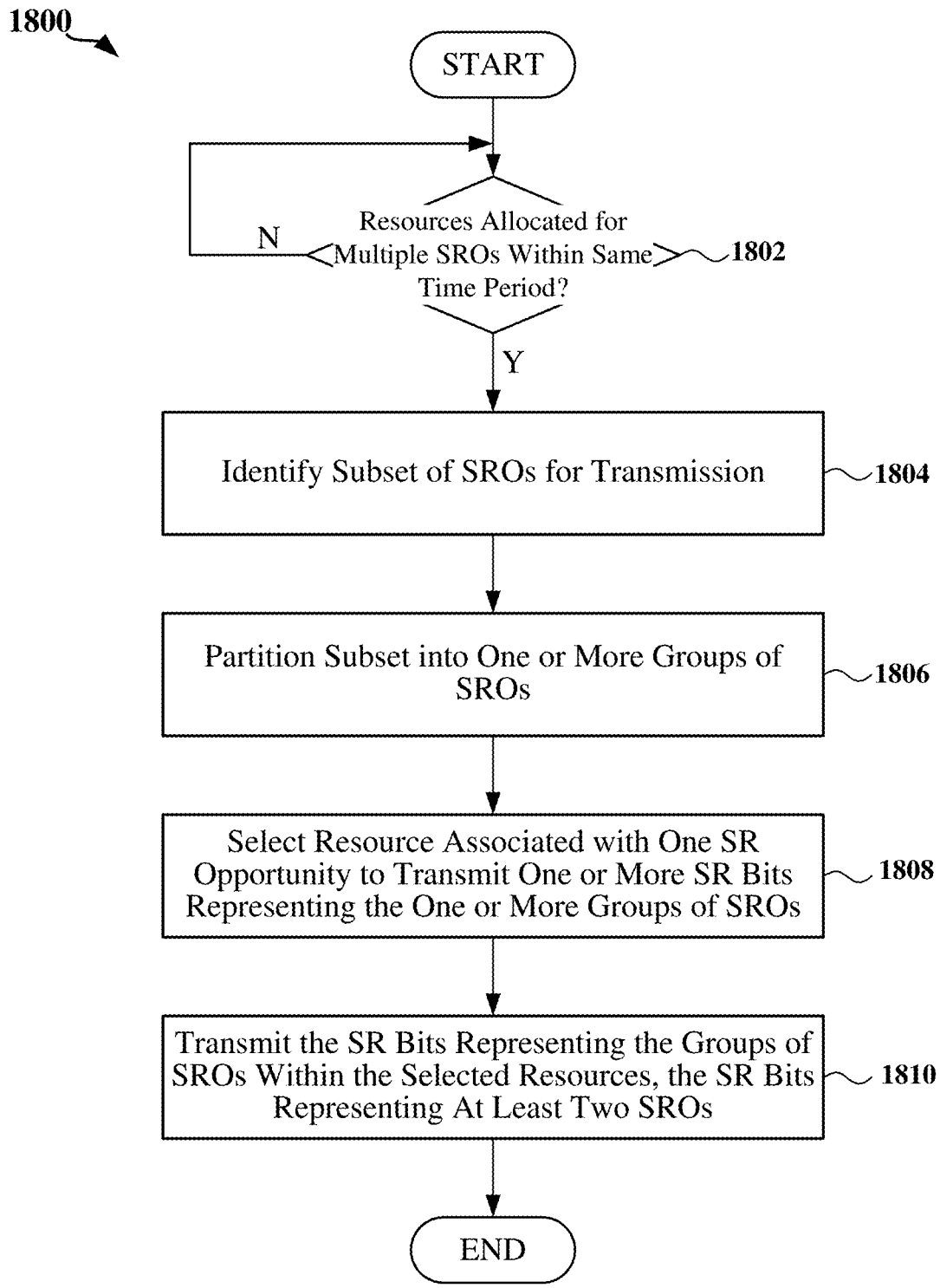
FIG. 18 is a flow chart illustrating another exemplary process for determining resources for an SR transmission.

FIG. 18 is a flow chart illustrating an exemplary process 1800 for determining resources for an SR transmission. As described below, some or all illustrated features may be omitted in a particular implementation within the scope of the present disclosure, and some illustrated features may not be required for implementation of all embodiments. In some examples, the process 1800 may be carried out by the scheduled entity illustrated in FIG. 12. In some examples, the process 1800 may be carried out by any suitable apparatus or means for carrying out the functions or algorithm described below.

At block 1802, the scheduled entity may determine whether resources have been allocated for multiple SR opportunities within the same time period. For example, the scheduled entity may determine that the resources allocated to each of the SR opportunities fully or partially overlaps with one another in time or that the respective time difference between each of the resources allocated to the multiple SR opportunities is within less than a threshold time duration. For example, the SR management circuitry 1243 shown and described above in reference to FIG. 12 may determine whether resources have been allocated for multiple SR opportunities within the same time period.

If resources have been allocated to multiple SR opportunities within the same time period (Y branch of block 1802), at block 1804, the scheduled entity may identify a subset of SR opportunities. In some examples, the scheduled entity may identify the subset of SR opportunities based on a suitable set of factors or parameters. For example, the scheduled entity may identify the subset of SR opportunities based on one or more of a respective priority of each of the logical channels or the respective resources allocated to each of the SR opportunities. The subset of SR opportunities may include all or only a portion of the plurality of SR opportunities. For example, the SR management circuitry 1243 shown and described above in reference to FIG. 12 may identify the subset of SR opportunities.

At block 1806, the scheduled entity may partition the subset of SR opportunities into one or more groups of SR opportunities. In some examples, the scheduled entity may partition the subset of SR opportunities into the one or more groups of SR opportunities based on one or more of a respective priority of each of the logical channels or the respective resources allocated to each of the SR opportunities in the subset of SR opportunities. Each group of SR opportunities may include one or more SR opportunities included in the subset of SR opportunities. For example, the SR management circuitry 1243 shown and described above in reference to FIG. 12 may partition the subset of SR opportunities into one or more groups of SR opportunities.

At block 1808, the scheduled entity may select the resource associated with (allocated to) a single one of the SR opportunities in the subset of opportunities on which to transmit one or more SR bits representing the one or more groups of SR opportunities. For example, the SR management circuitry 1243 shown and described above in reference to FIG. 12 may select the resource on which to transmit the SR bits from among the resources allocated to the subset of SR opportunities.

At block 1810, the scheduled entity may transmit one or more SR bits representing the one or more groups of SR opportunities to the scheduling entity on the selected resource allocated to the scheduled entity. The one or more SR bits represents at least two of the SR opportunities. In some examples, the scheduled entity may generate a respective single bit for each group of SR opportunities and transmit all of the SR bits together on the selected resource. In other examples, the scheduled entity may generate a fewer number of SR bits than groups based on a "smart" mapping between group SR status combinations and possible SR bit combinations and transmit the fewer number of SR bits on the selected resource. For example, the SR management circuitry 1243, together with the UL traffic and control channel generation and transmission circuitry 1241 and transceiver 1210, may transmit the SR bits to the scheduling entity.

Figure 19:
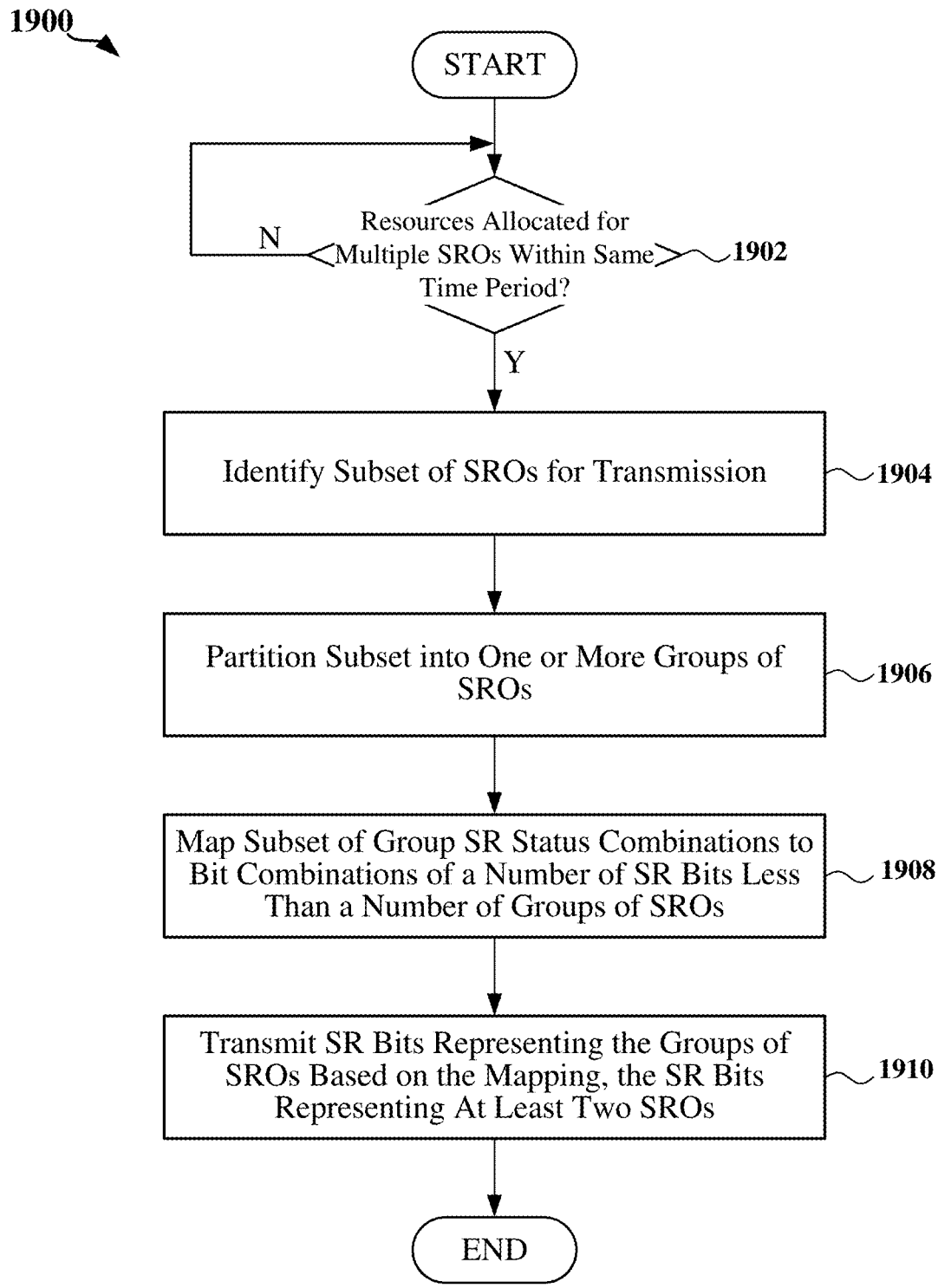
FIG. 19 is a flow chart illustrating another exemplary process for determining resources for an SR transmission.

FIG. 19 is a flow chart illustrating an exemplary process 1900 for determining resources for an SR transmission. As described below, some or all illustrated features may be omitted in a particular implementation within the scope of the present disclosure, and some illustrated features may not be required for implementation of all embodiments. In some examples, the process 1900 may be carried out by the scheduled entity illustrated in FIG. 12. In some examples, the process 1900 may be carried out by any suitable apparatus or means for carrying out the functions or algorithm described below.

At block 1902, the scheduled entity may determine whether resources have been allocated for multiple SR opportunities within the same time period. For example, the scheduled entity may determine that the resources allocated to each of the SR opportunities fully or partially overlaps with one another in time or that the respective time difference between each of the resources allocated to the multiple SR opportunities is within less than a threshold time duration. For example, the SR management circuitry 1243 shown and described above in reference to FIG. 12 may determine whether resources have been allocated for multiple SR opportunities within the same time period.

If resources have been allocated to multiple SR opportunities within the same time period (Y branch of block 1902), at block 1904, the scheduled entity may identify a subset of SR opportunities. In some examples, the scheduled entity may identify the subset of SR opportunities based on a suitable set of factors or parameters. For example, the scheduled entity may identify the subset of SR opportunities based on one or more of a respective priority of each of the logical channels or the respective resources allocated to each of the SR opportunities. The subset of SR opportunities may include all or only a portion of the plurality of SR opportunities. For example, the SR management circuitry 1243 shown and described above in reference to FIG. 12 may identify the subset of SR opportunities.

At block 1906, the scheduled entity may partition the subset of SR opportunities into one or more groups of SR opportunities. In some examples, the scheduled entity may partition the subset of SR opportunities into the one or more groups of SR opportunities based on one or more of a respective priority of each of the logical channels or the respective resources allocated to each of the SR opportunities in the subset of SR opportunities. Each group of SR opportunities may include one or more SR opportunities included in the subset of SR opportunities. For example, the SR management circuitry 1243 shown and described above in reference to FIG. 12 may partition the subset of SR opportunities into one or more groups of SR opportunities.

At block 1908, the scheduled entity may map a subset of group SR status combinations to respective bit combinations of a number of SR bits when the number of SR bits allowed to be transmitted is less than the number of groups of SR opportunities. In this example, each group SR status for each group of SR opportunities indicates either a positive SR, a negative SR, or an unknown SR for that group. For example, the SR management circuitry 1243 shown and described above in reference to FIG. 12 may map the group SR status combinations to SR bit combinations.

At block 1910, the scheduled entity may transmit the reduced number of SR bits representing the groups of SR opportunities to the scheduling entity on a single UL resource allocated to the scheduled entity. The reduced number of SR bits represents at least two of the SR opportunities. In some examples, the scheduled entity may transmit the reduced number of SR bits together on one of the UL resources allocated to one of the SR opportunities in the subset or may append the reduced number of SR bits to other uplink control information (UCI) scheduled for transmission within the same time period and transmit the combined UL information (UCI+SR) on the UL resource allocated to the UCI. For example, the SR management circuitry 1243, together with the UL traffic and control channel generation and transmission circuitry 1241 and transceiver 1210, may transmit the reduced number of SR bits to the scheduling entity.

In one configuration, a scheduled entity (e.g., a UE) for wireless communication includes means for determining that respective resources allocated to each of a plurality of scheduling request (SR) opportunities are within a same time period, in which the SR opportunities each correspond to a respective logical channel, means for identifying a subset of the plurality of SR opportunities for transmission, means for partitioning the subset into one or more groups of SR opportunities, and means for transmitting one or more SR bits representing the one or more groups of SR opportunities, in which the one or more SR bits represent at least two of the SR opportunities.

In one aspect, the aforementioned means for determining that respective resources allocated to each of a plurality of scheduling request (SR) opportunities are within a same time period, means for identifying a subset of the plurality of SR opportunities for transmission, and means for partitioning the subset into one or more groups of SR opportunities may be the processor(s) 1204 shown in FIG. 12 configured to perform the functions recited by the aforementioned means. For example, the aforementioned means for determining that respective resources allocated to each of a plurality of scheduling request (SR) opportunities are within a same time period, means for identifying a subset of the plurality of SR opportunities for transmission, and means for partitioning the subset into one or more groups of SR opportunities may include the SR management circuitry 1243 shown in FIG. 12. In another aspect, the aforementioned means for transmitting one or more SR bits representing the one or more groups of SR opportunities may be the transceiver 1210 and the processor(s) 1204 shown in FIG. 12 configured to perform the functions recited by the aforementioned means. In still another aspect, the aforementioned means may be a circuit or any apparatus configured to perform the functions recited by the aforementioned means.

The scheduled entity (e.g., a UE) may further include means for determining that an uplink (UL) resource allocated for uplink control information (UCI) occurs within the same time period as the respective resources allocated to each of the plurality of SR opportunities, means for appending the one or more SR bits representing the one or more groups of SR opportunities to the UCI to produce combined UL information, and means for transmitting the combined UL information within the UL resource.

In one aspect, the aforementioned means for determining that an uplink (UL) resource allocated for uplink control information (UCI) occurs within the same time period as the respective resources allocated to each of the plurality of SR opportunities, means for appending the one or more SR bits representing the one or more groups of SR opportunities to the UCI to produce combined UL information, and means for transmitting the combined UL information within the UL resource may be the processor(s) 1204 shown in FIG. 12 configured to perform the functions recited by the aforementioned means. For example, the aforementioned means for determining that an uplink (UL) resource allocated for uplink control information (UCI) occurs within the same time period as the respective resources allocated to each of the plurality of SR opportunities and means for appending the one or more SR bits representing the one or more groups of SR opportunities to the UCI to produce combined UL information may include the SR management circuitry 1243 shown in FIG. 12. In another aspect, the aforementioned means for transmitting the combined UL information within the UL resource may be the transceiver 1210 and the processor(s) 1204 shown in FIG. 12 configured to perform the functions recited by the aforementioned means. In still another aspect, the aforementioned means may be a circuit or any apparatus configured to perform the functions recited by the aforementioned means.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as New Radio (NR), LTE, the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing Institute of Electrical and Electronics Engineers (IEEE) 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-19 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 6, and 11-13 may be configured to perform one or more of the methods, features, or steps escribed herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication, comprising:
   determining that respective resources allocated to each of a plurality of scheduling request (SR) opportunities are within a same time period, the SR opportunities each corresponding to a respective one of a plurality of logical channels;
   identifying a subset of the plurality of SR opportunities for transmission;
   partitioning the subset into one or more groups of SR opportunities, each group of SR opportunities comprising one or more SR opportunities;

mapping one or more groups of SR opportunities to a respective group SR status combination each represented by a respective bit combination of one or more SR bits, wherein each of the group SR status combinations comprises a positive SR status, a negative SR status, or an unknown SR status for each of the groups of SR opportunities; and transmitting the one or more SR bits representing the one or more groups of SR opportunities, wherein the one or more SR bits further represents at least two of the SR opportunities, and wherein the one or more SR bits comprise a number of SR bits less than a number of groups of SR opportunities.

2. The method of claim 1, further comprising:
determining that an uplink (UL) resource allocated for uplink control information (UCI) occurs within the same time period as the respective resources allocated to each of the plurality of SR opportunities.

3. The method of claim 2, wherein transmitting the one or more SR bits representing the one or more groups of SR opportunities further comprises:
appending the one or more SR bits representing the one or more groups of SR opportunities to the UCI to produce combined UL information; and
transmitting the combined UL information within the UL resource.

4. The method of claim 1, further comprising:
mapping the groups of SR opportunities to the one or more SR bits in an SR bit field based on one or more of a respective priority of each of the logical channels corresponding to the one or more SR opportunities included in each of the groups or the respective resources allocated to each of the respective SR opportunities in each of the groups.

5. The method of claim 4, wherein mapping the groups of SR opportunities to the one or more SR bits in the SR bit field further comprises:
identifying a respective group priority of each of the groups of SR opportunities based on the respective priority of each of the logical channels corresponding to the one or more SR opportunities included in the respective groups; and
mapping the groups of SR opportunities to the one or more SR bits in the SR bit field based on an order of the respective group priorities.

6. The method of claim 4, wherein mapping the groups of SR opportunities to the one or more SR bits in the SR bit field further comprises:
mapping the groups of SR opportunities to the one or more SR bits in the SR bit field based on an order of either a respective time or a respective size associated with each of the respective resources allocated to each of the respective SR opportunities in each of the groups.

7. The method of claim 1, wherein determining that respective resources allocated to each of the plurality of SR opportunities are within a same time period further comprises:
determining that each of the plurality of SR opportunities are within less than a threshold time duration apart from one another.

8. The method of claim 1, further comprising:
selecting the respective resources associated with an SR opportunity from among the subset of the plurality SR opportunities to carry the one or more SR bits.

9. The method of claim 1, further comprising:
generating a respective SR bit of the one or more SR bits for each of the groups of SR opportunities, wherein each of the groups of SR opportunities is associated with a single SR bit of the one or more SR bits.

10. The method of claim 9, wherein generating the respective SR bit of the one or more SR bits for each of the groups of SR opportunities further comprises:
setting the respective SR bit for a group of the one or more groups of SR opportunities to indicate a positive SR when uplink data is present in a buffer for at least one of the logical channels associated with the group.

11. The method of claim 1, wherein partitioning the subset into the one or more groups of SR opportunities further comprises:
partitioning the subset into the one or more groups of SR opportunities based on one or more of a respective priority of each of the logical channels corresponding to each of the SR opportunities or the respective resources allocated to each of the SR opportunities.

12. The method of claim 1, wherein partitioning the subset into the one or more groups of SR opportunities further comprises:
partitioning the subset into the one or more groups of SR opportunities such that each of the groups of SR opportunities is associated with a different respective range of numbers of resource elements.

13. The method of claim 1, wherein identifying the subset of the plurality of SR opportunities for transmission further comprises:
identifying the subset of the plurality of SR opportunities for transmission based on one or more of a respective priority of each of the logical channels corresponding to each of the SR opportunities or the respective resources allocated to each of the SR opportunities.

14. The method of claim 1, wherein identifying the subset of the plurality of SR opportunities for transmission further comprises:
selecting the SR opportunities associated with the logical channels comprising a respective priority greater than a minimum priority for inclusion in the subset of the plurality of SR opportunities.

15. The method of claim 1, wherein identifying the subset of the plurality of SR opportunities for transmission comprises:
identifying the subset of the plurality of SR opportunities for transmission based on a respective time of each of the respective resources allocated to each of the SR opportunities.

16. The method of claim 1, wherein identifying the subset of the plurality of SR opportunities for transmission further comprises:
selecting the SR opportunities comprising at least a threshold number of resource elements within the respective resources allocated thereto for inclusion in the subset of the plurality of SR opportunities.

17. The method of claim 1, wherein mapping the respective subset of group SR status combinations to each respective bit combination of the number of SR bits further comprises:
calculating the number of SR bits based on a binary logarithm of one greater than the number of groups of SR opportunities;
identifying a first subset of group SR status combinations comprising a first number of group SR status combinations equal to one greater than the number of groups of SR opportunities, wherein each of the first subset of group SR status combinations indicates a respective SR status for each of the groups of SR opportunities based on a respective priority of each of the groups of SR opportunities;

identifying a second subset of group SR statuses different than the first subset of group SR statuses, wherein the second subset of group SR statuses comprises a second number of group SR statuses equal to a difference between a number of bit combinations of the one or more SR bits and the first number of group SR status; and mapping the first subset of group SR statuses and the second subset of group SR statuses to the respective bit combinations of the number of SR bits.

18. An apparatus for wireless communication, comprising:

a transceiver;

a memory; and a processor communicatively coupled to the transceiver and the memory, the processor configured to:

determine that respective resources allocated to each of a plurality of scheduling request (SR) opportunities are within a same time period, the SR opportunities each corresponding to a respective one of a plurality of logical channels;

identify a subset of the plurality of SR opportunities for transmission;

partition the subset into one or more groups of SR opportunities, each group of SR opportunities comprising one or more SR opportunities;

map one or more groups of SR opportunities to a respective group SR status combination each represented by a respective bit combination of one or more SR bits, wherein each of the group SR status combinations comprises a positive SR status, a negative SR status, or an unknown SR status for each of the groups of SR opportunities; and transmit the one or more SR bits representing the one or more groups of SR opportunities, wherein the one or more SR bits represents at least two of the SR opportunities, and wherein the one or more SR bits comprise a number of SR bits less than a number of groups of SR opportunities.

19. The apparatus of claim 18, wherein the processor is further configured to:

determine that an uplink (UL) resource allocated for uplink control information (UCI) occurs within the same time period as the respective resources allocated to each of the plurality of SR opportunities;

append the one or more SR bits representing the one or more groups of SR opportunities to the UCI to produce combined UL information; and transmit the combined UL information within the UL resource.

20. The apparatus of claim 18, wherein the processor is further configured to:

map the groups of SR opportunities to the one or more SR bits in an SR bit field based on one or more of a respective priority of each of the logical channels corresponding to the one or more SR opportunities included in each of the groups or the respective resources allocated to each of the respective SR opportunities in each of the groups.

21. The apparatus of claim 18, wherein the processor is further configured to:

determine that each of the plurality of SR opportunities are within less than a threshold time duration apart from one another; and select the respective resources associated with an SR opportunity from among the plurality of SR opportunities to carry the one or more SR bits.

22. The apparatus of claim 18, wherein the processor is further configured to:

generate a respective SR bit of the one or more SR bits for each of the groups of SR opportunities, wherein each of the groups of SR opportunities is associated with a single SR bit of the one or more SR bits; and set the respective SR bit for a group of the one or more groups of SR opportunities to indicate a positive SR when uplink data is present in a buffer for at least one of the logical channels associated with the group.

23. The apparatus of claim 18, wherein the processor is further configured to:

partition the subset into the one or more groups of SR opportunities based on one or more of a respective priority of each of the logical channels corresponding to each of the SR opportunities or the respective resources allocated to each of the SR opportunities.

24. The apparatus of claim 18, wherein the processor is further configured to:

identify the subset of the plurality of SR opportunities for transmission based on one or more of a respective priority of each of the logical channels corresponding to each of the SR opportunities or the respective resources allocated to each of the SR opportunities.

25. The apparatus of claim 18, wherein the processor is further configured to:

calculate the number of bits based on a binary logarithm of one greater than the number of groups of SR opportunities;

identify a first subset of group SR status combinations comprising a first number of group SR status combinations equal to one greater than the number of groups of SR opportunities, wherein each of the first subset of group SR status combinations indicates a respective SR status for each of the groups of SR opportunities based on a respective priority of each of the groups of SR opportunities;

identify a second subset of group SR status combinations different than the first subset of group SR status combinations, wherein the second subset of group SR status combinations comprises a second number of group SR status combinations equal to a difference between a number of bit combinations of the one or more SR bits and the first number of group SR status combinations; and map the first subset of group SR status combinations and the second subset of group SR status combinations to the respective bit combinations of the number of SR bits.

26. An apparatus for wireless communication, comprising:

means for determining that respective resources allocated to each of a plurality of scheduling request (SR) opportunities are within a same time period, the SR opportunities each corresponding to a respective one of a plurality of logical channels;

means for identifying a subset of the plurality of SR opportunities for transmission;

means for partitioning the subset into one or more groups of SR opportunities, each group of SR opportunities comprising one or more SR opportunities;

means for mapping one or more groups of SR opportunities to a respective group SR status combination each represented by a respective bit combination of one or more SR bits, wherein each of the group SR status combinations comprises a positive SR status, a negative SR status, or an unknown SR status for each of the groups of SR opportunities; and means for transmitting one or more SR bits representing the one or more groups of SR opportunities, wherein the one or more SR bits represents at least two of the SR opportunities, and wherein the one or more SR bits comprise a number of SR bits less than a number of groups of SR opportunities.

27. The apparatus of claim 26, further comprising:

means for determining that an uplink (UL) resource allocated for uplink control information (UCI) occurs within the same time period as the respective resources allocated to each of the plurality of SR opportunities;

means for appending the one or more SR bits representing the one or more groups of SR opportunities to the UCI to produce combined UL information; and means for transmitting the combined UL information within the UL resource.

* * * * *